(12) United States Patent
Mishima et al.

(10) Patent No.: US 12,243,252 B2
(45) Date of Patent: Mar. 4, 2025

(54) LEARNING METHOD, STORAGE MEDIUM, AND IMAGE PROCESSING DEVICE

(71) Applicant: KABUSHIKI KAISHA TOSHIBA, Tokyo (JP)

(72) Inventors: Nao Mishima, Tokyo (JP); Akihito Seki, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 415 days.

(21) Appl. No.: 17/682,696

(22) Filed: Feb. 28, 2022

(65) Prior Publication Data

US 2023/0032387 A1 Feb. 2, 2023

(30) Foreign Application Priority Data

Jul. 29, 2021 (JP) .................................. 2021-124296

(51) Int. Cl.
*G06T 7/55* (2017.01)
*G06V 10/774* (2022.01)
*G06V 10/776* (2022.01)

(52) U.S. Cl.
CPC .............. *G06T 7/55* (2017.01); *G06V 10/774* (2022.01); *G06V 10/776* (2022.01); *G06T 2207/10028* (2013.01); *G06T 2207/20081* (2013.01)

(58) Field of Classification Search
CPC .............. G06T 7/55; G06T 2207/10028; G06T 2207/20081; G06V 10/774; G06V 10/776
See application file for complete search history.

(56) References Cited

U.S. PATENT DOCUMENTS

| | | | |
|---|---|---|---|
| 10,951,835 B1 * | 3/2021 | Kashiwagi | ........... H04N 23/675 |
| 11,030,760 B2 | 6/2021 | Kashiwagi et al. | |
| 11,100,662 B2 | 8/2021 | Mishima et al. | |
| 2014/0009634 A1 * | 1/2014 | Hiwada | .................. H04N 23/00 348/222.1 |
| 2019/0080481 A1 | 3/2019 | Yamaguchi et al. | |

(Continued)

FOREIGN PATENT DOCUMENTS

| | | | | |
|---|---|---|---|---|
| GB | 2585197 A * | 1/2021 | ............. | G06T 7/593 |
| JP | 2019049457 A | 3/2019 | | |

(Continued)

OTHER PUBLICATIONS

U.S. Appl. No. 17/466,794, First Named Inventor: Nao Mishima; Title: "Learning Method, Storage Medium and Image Processing Device"; Filed: Sep. 3, 2021.

(Continued)

*Primary Examiner* — Chan S Park
*Assistant Examiner* — Sebastian-Sy Vuchi Ngo
(74) *Attorney, Agent, or Firm* — Holtz, Holtz & Volek PC

(57) ABSTRACT

According to one embodiment, a learning method includes acquiring first multi-view images obtained by capturing a first subject and causing a statistical model to learn, based on first and second bokeh values output from the statistical model by inputting first and second images of the first multi-view images. The causing includes acquiring a first distance from the capture device to a first subject in the first image and a second distance from the capture device to a first subject in the second image, discriminating a relationship in length between the first and second distances, and causing the statistical model to learn such that a relationship in magnitude between the first and second bokeh values is equal to the discriminated relationship.

20 Claims, 12 Drawing Sheets

(56) References Cited

U.S. PATENT DOCUMENTS

| | | | |
|---|---|---|---|
| 2020/0051264 | A1 | 2/2020 | Mishima et al. |
| 2020/0294260 | A1 | 9/2020 | Kashiwagi et al. |
| 2021/0312233 | A1 | 10/2021 | Mishima et al. |
| 2021/0319537 | A1* | 10/2021 | Hiasa .................. G06V 10/751 |
| 2022/0036513 | A1* | 2/2022 | Luo ......................... G06T 5/60 |
| 2022/0046219 | A1* | 2/2022 | Obla ..................... H04N 23/957 |
| 2022/0076063 | A1* | 3/2022 | Park ........................ G06V 10/82 |
| 2022/0188571 | A1 | 6/2022 | Mishima et al. |
| 2022/0301210 | A1 | 9/2022 | Mishima et al. |

FOREIGN PATENT DOCUMENTS

| | | | |
|---|---|---|---|
| JP | 2020026990 | A | 2/2020 |
| JP | 2020148483 | A | 9/2020 |
| JP | 2021165944 | A | 10/2021 |
| JP | 2022094636 | A | 6/2022 |
| JP | 2022142532 | | 9/2022 |

OTHER PUBLICATIONS

U.S. Appl. No. 17/467,720, First Named Inventor: Nao Mishima; Title: "Learning Method, Storage Medium, and Image Processing Device"; Filed: Sep. 7, 2021.

U.S. Appl. No. 17/678,088, First Named Inventor: Naoki Nishizawa; Title: "Estimation Device and Method"; Filed: Feb. 23, 2022.

Agarwal, et al., "Building Rome in a Day", Communications of the ACM, vol. 54, No. 10, 2011, pp. 105-112.

Burges, et al., "Learning to Rank Using Gradient Descent", Proceedings of the 22nd International Conference on Machine Learning, 2005, pp. 89-96.

Furukawa, et al., "Accurate, Dense, and Robust Multiview Stereopsis", IEEE Transactions on Pattern Analysis and Machine Intelligence, vol. 32, No. 8, 2010, pp. 1362-1376.

Kashiwagi, et al., "Deep Depth From Aberration Map", 2019 IEEE/CVF International Conference on Computer Vision (ICCV), 2019.

Mishima, et al., "Physical Cue based Depth-Sensing by Color Coding with Deaberration Network", BMVC, 2019, pp. 1-13.

Xian, et al., "Structure-Guided Ranking Loss for Single Image Depth Prediction", IEEE/CVF Conference on Computer Vision and Pattern Recognition (CVPR), 2020, pp. 608-617.

Yilmaz, "Figure 2", from "Stereo and kinect fusion for continuous 3D reconstruction and visual odometry," 2013 International Conference on Electronics, Computer and Computation (ICECCO), Nov. 2013, https://www.researchgate.net/figure/Structure-from-Motion-SfM-process-is-illustrated-the-structure-in-the_fig2_269327935.

* cited by examiner

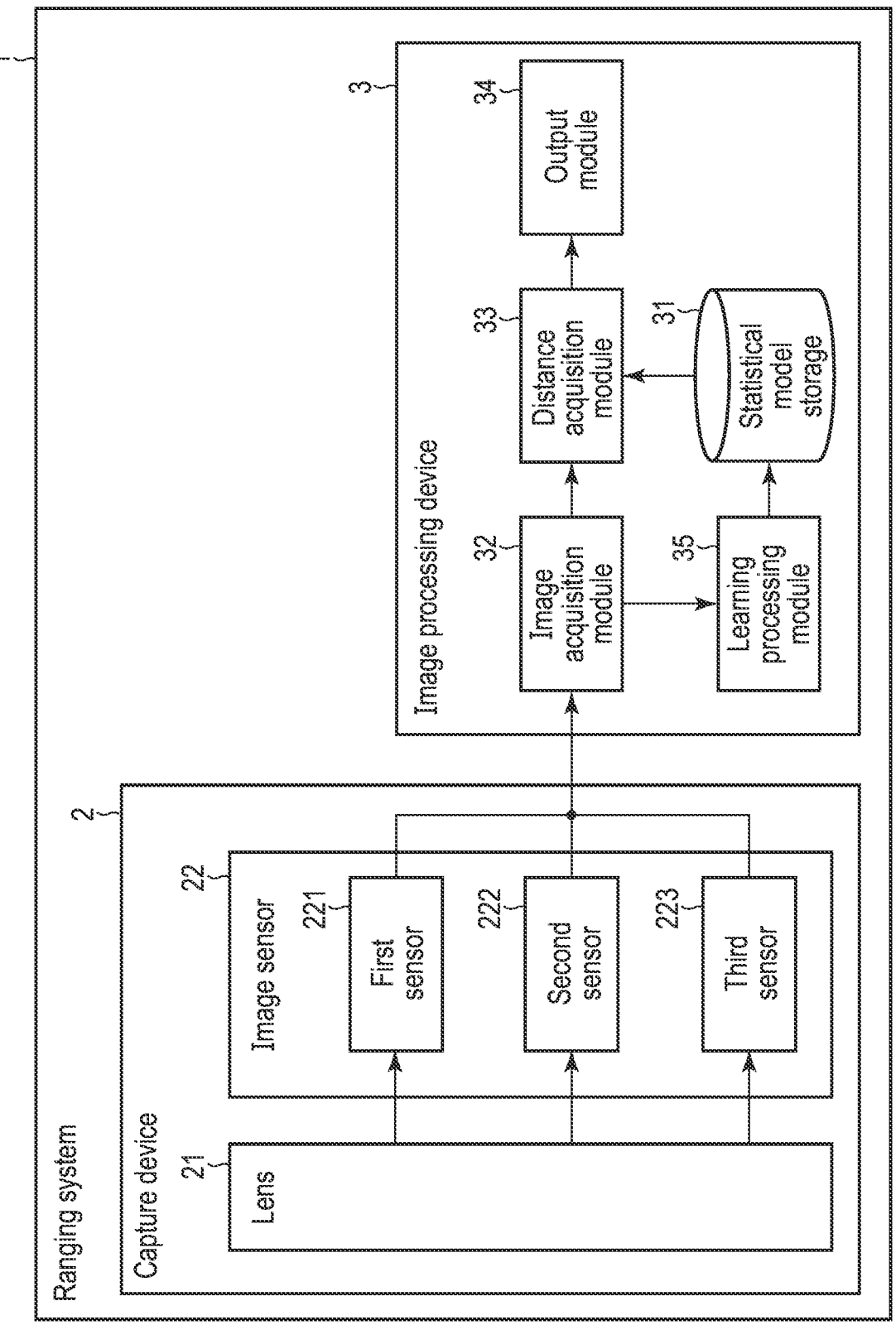
F I G. 1

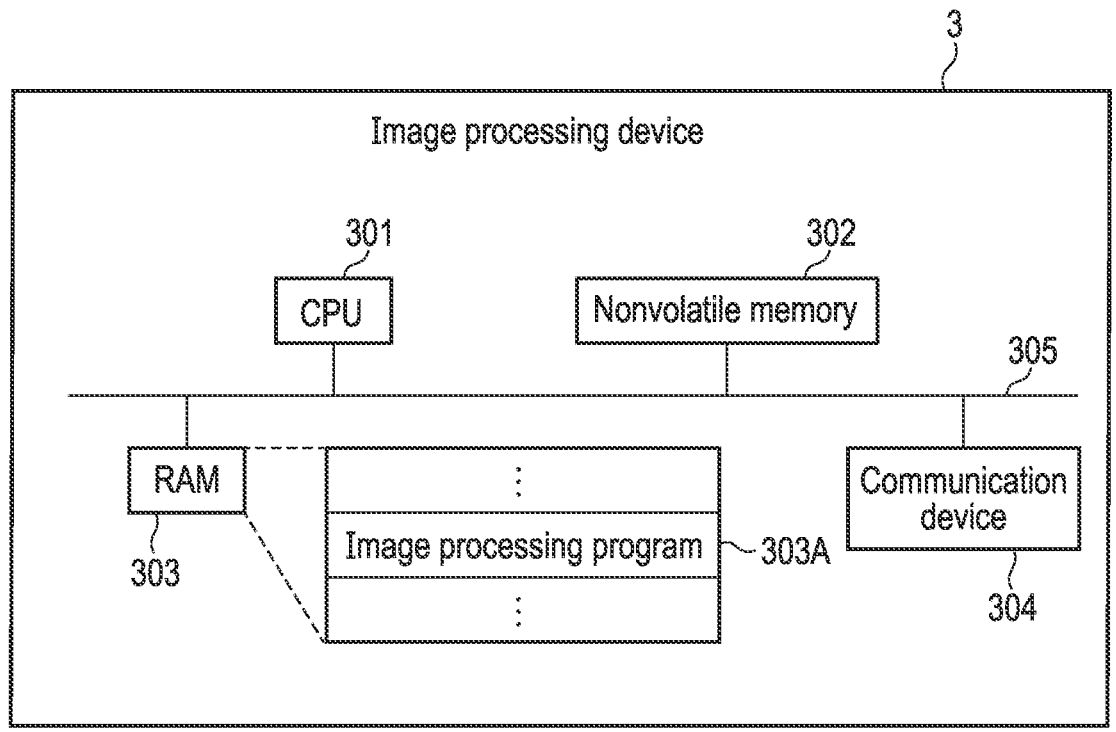
F I G. 2
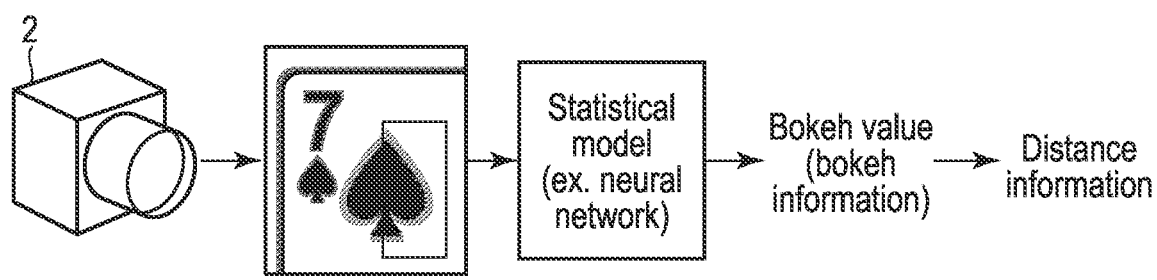
F I G. 3

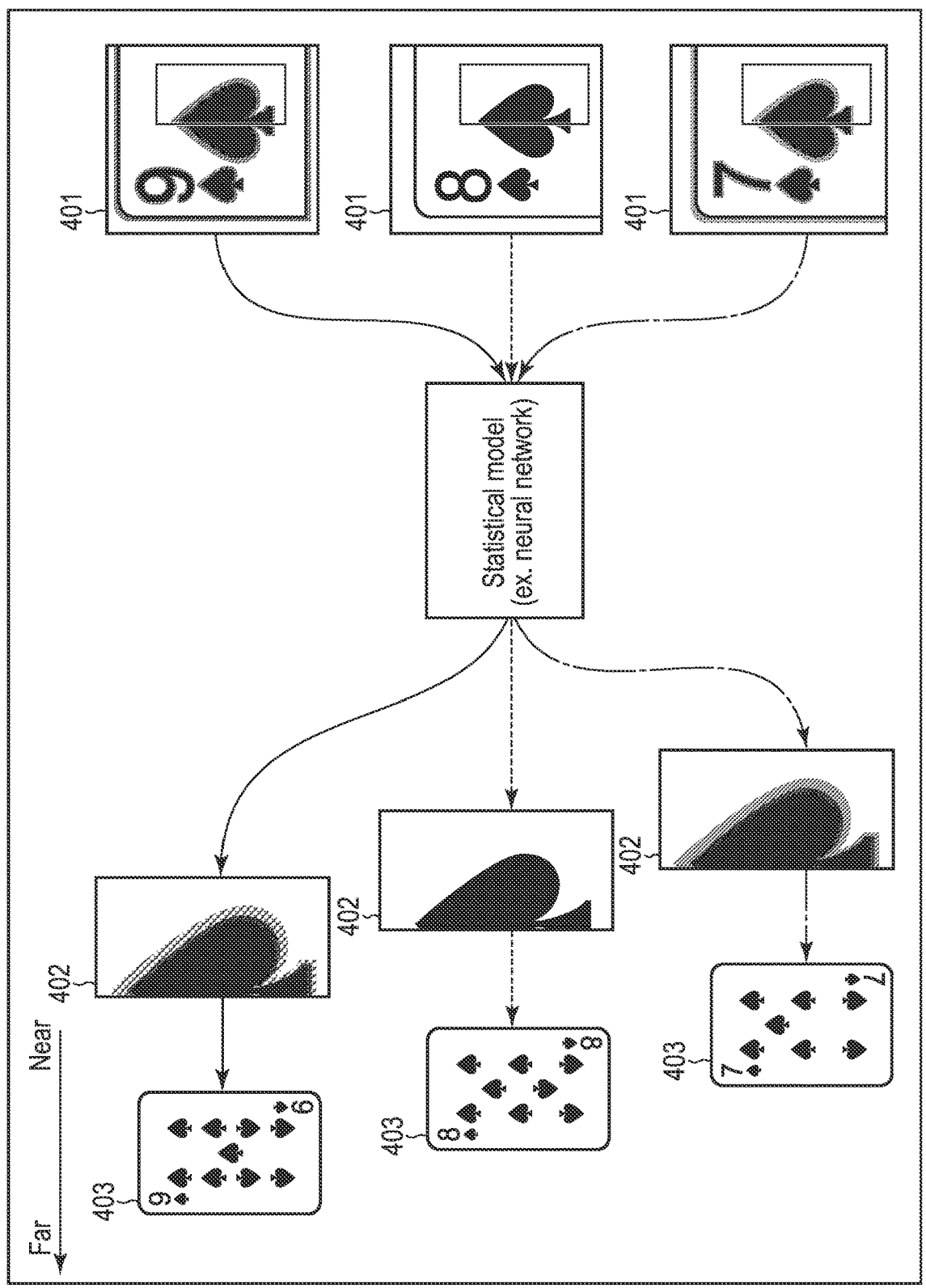
F I G. 4

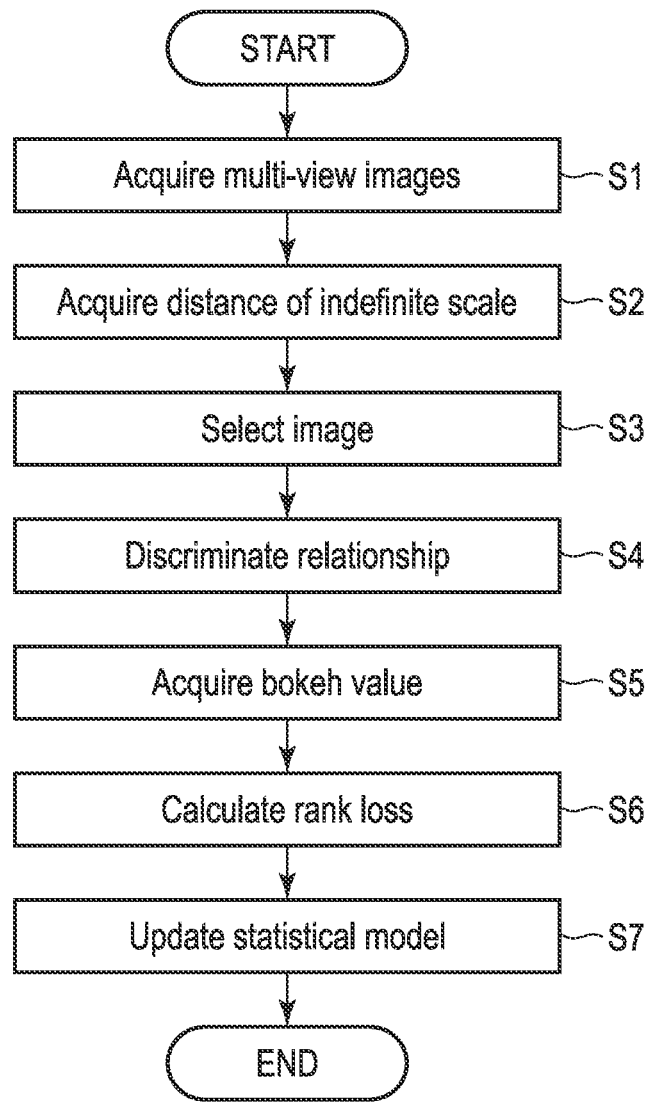
F I G. 13

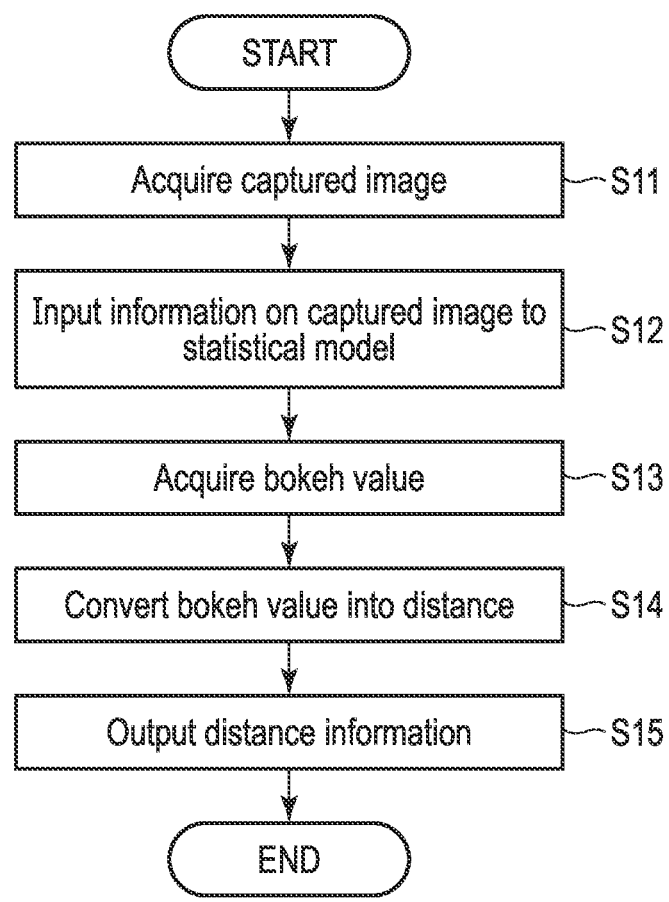
F I G. 16

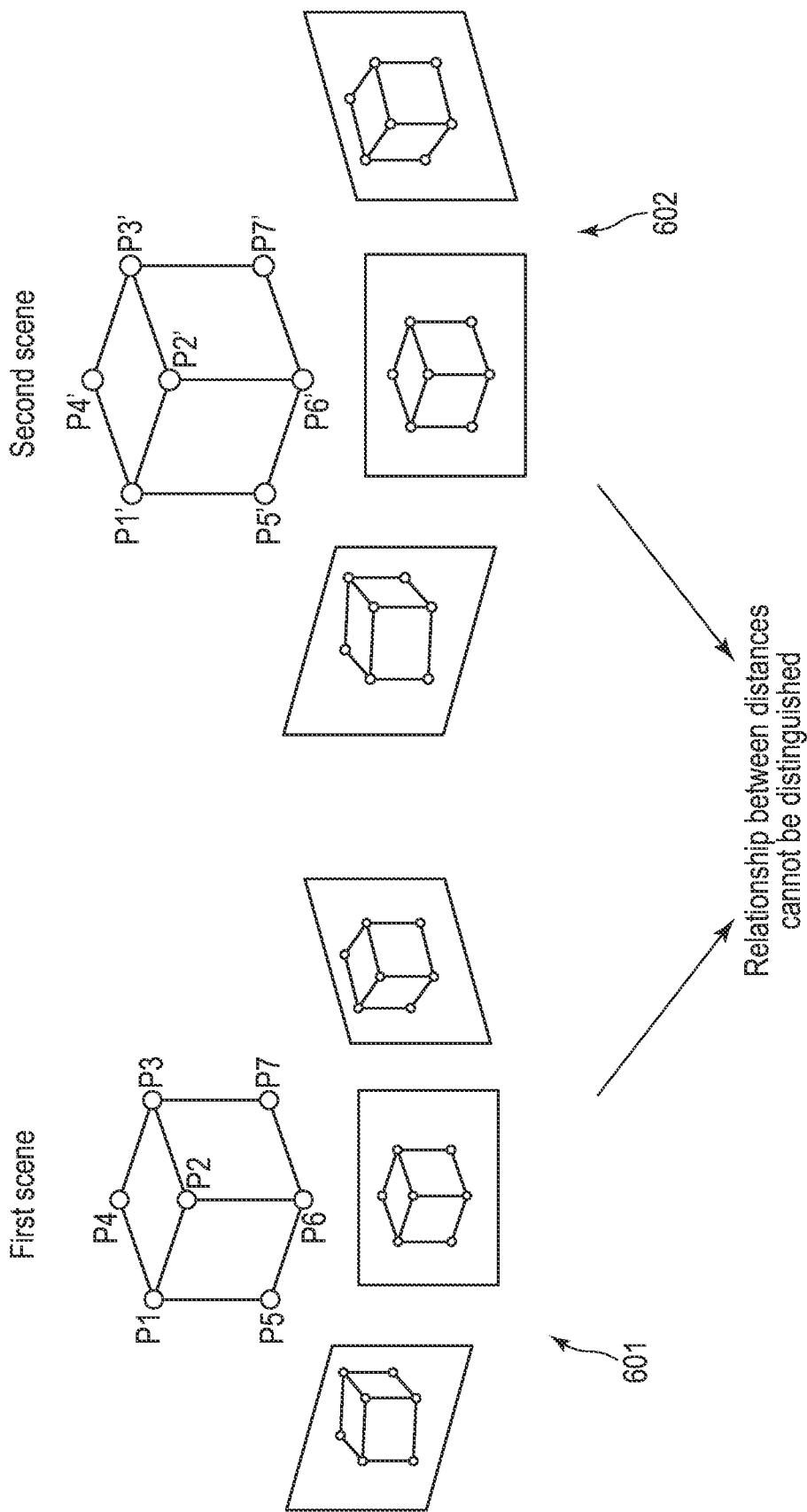
F I G. 17

LEARNING METHOD, STORAGE MEDIUM, AND IMAGE PROCESSING DEVICE

CROSS-REFERENCE TO RELATED APPLICATIONS

This application is based upon and claims the benefit of priority from Japanese Patent Application No. 2021-124296, filed Jul. 29, 2021, the entire contents of which are incorporated herein by reference.

FIELD

Embodiments described herein relate generally to a learning method, a storage medium, and an image processing device.

BACKGROUND

To acquire a distance to a subject, use of images captured by two capture devices (cameras) or stereo cameras (compound-eye cameras) has been known and, in recent years, a technology of obtaining a distance to a subject using images captured by a single capture device (monocular camera) has been developed.

Use of a statistical model generated by applying a machine learning algorithm such as a neural network has been considered to acquire a distance to a subject using images as described above.

To generate a high-accuracy statistical model, however, a massive amount of a data set for learning (i.e., a set of a learning image and a correct value related to the distance to the subject in the learning image) needs to be learned by the statistical model but preparation of the data set is not easy.

BRIEF DESCRIPTION OF THE DRAWINGS

FIG. 1 is a diagram showing an example of a configuration of a ranging system according to a first embodiment.

FIG. 2 is a diagram showing an example of a system configuration of an image processing device.

FIG. 3 is a view illustrating an outline of an operation of a ranging system.

FIG. 4 is a diagram illustrating a principle of acquiring a distance to a subject.

FIG. 13 is a flowchart showing an example of a procedure of an image processing device upon causing the statistical model to learn.

FIG. 16 is a flowchart snowing an example of a procedure of an image processing device upon acquiring distance information from a captured image.

FIG. 17 is a view illustrating a case where a statistical model is caused to learn using multi-view images captured in a plurality of scenes.

DETAILED DESCRIPTION

Figure 5:
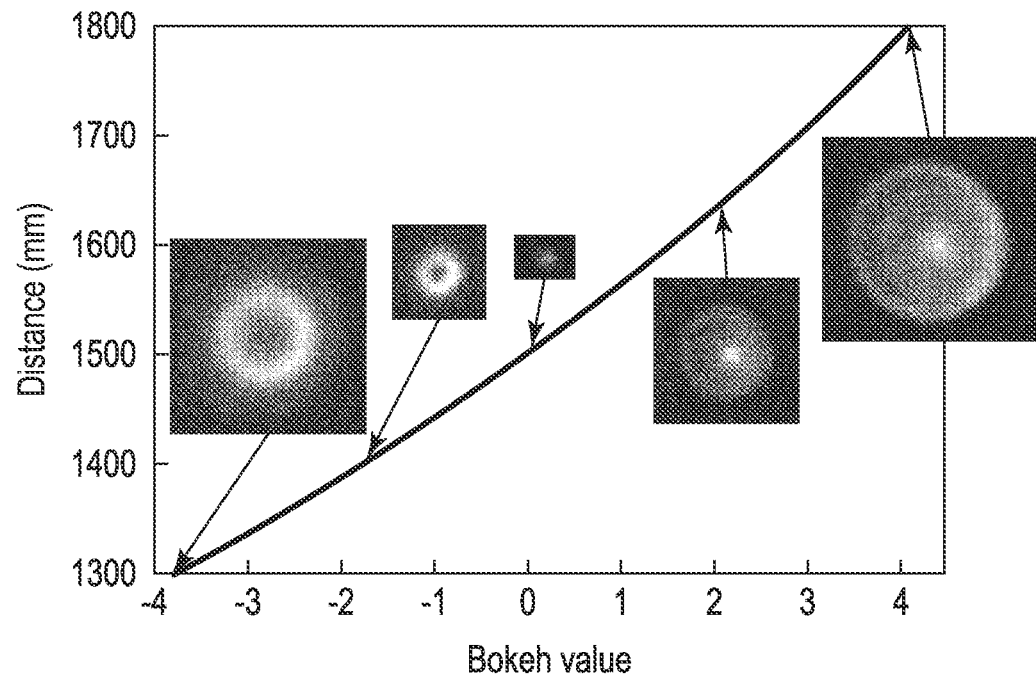
FIG. 5 is a graph specifically illustrating a bokeh value predicted by a statistical model.

In general, according to one embodiment, a learning method causing a statistical model to learn, for inputting an image including a subject and outputting a bokeh value indicating bokeh occurring in the image in accordance with a distance to the subject is provided. The learning method includes acquiring first multi-view images obtained by capturing a first subject from multiple viewpoints by a capture device, and causing the statistical model to learn, based on a first bokeh value output from the statistical model by inputting a first image of the first multi-view images, and a second bokeh value output from the statistical model by inputting a second image of the first multi-view images. The causing the statistical model to learn includes acquiring a first distance from the capture device to a first subject included in the first image upon capturing the first image and a second distance from the capture device to a first subject included in the second image upon capturing the second image, from the first multi-view images, discriminating a relationship in length between the first distance and the second distance, and causing the statistical model to learn such that a relationship in magnitude between the first bokeh value and the second bokeh value is equal to the discriminated relationship.

Various embodiments will be described hereinafter with reference to the accompanying drawings.

FIRST EMBODIMENT

FIG. 1 shows an example of a configuration of a ranging system according to a first embodiment. The ranging system 1 shown in FIG. 1 is used to capture an image and acquire (measure) a distance from a capture point to a subject using the captured image.

As shown in FIG. 1, the ranging system 1 includes a capture device 2 and an image processing device 3. In the present embodiment, it will be explained that the ranging system 1 includes the capture device 2 and the image processing device 3, which are separate devices, but the ranging system 1 may be realized as a single device (ranging device) in which the capture device 2 functions as a capture unit and the image processing device 3 functions as an image processing unit. In addition, the image processing device 3 may operate as, for example, a server which executes various types of cloud computing services.

The capture device 2 is used to capture various types of images. The capture device 2 includes a lens 21 and an image sensor 22. The lens 21 and the image sensor 22 are equivalent to an optical system monocular camera) of the capture device 2.

Light reflected on a subject is made incident on the lens 21. The light made incident on the lens 21 is transmitted through the lens 21. The light transmitted through the lens 21 reaches the image sensor 22 and is received (detected) by the image sensor 22. The image sensor 22 generates an image composed of a plurality of pixels by converting the received light into electric signals (photoelectric conversion).

The image sensor 22 is realized by, for example, a charge coupled device (CCD) image sensor, a complementary metal oxide semiconductor (CMOS) image sensor, or the like. The image sensor 22 includes, for example, a first sensor (R sensor) 221 that detects light of a red (R) wavelength band, a second sensor (G sensor) 222 that detects light of a green (G) wavelength band, and a third sensor (B sensor) 223 that detects light of a blue (B) wavelength band.

The image sensor 22 can receive the light of corresponding wavelength bands by the first to third sensors 221 to 223, and generate sensor images (R image, G image, and B image) corresponding to the respective wavelength bands (color components). The image captured by the capture device 2 is a color image (RGB image) and includes an R image, a G image and a B image.

In the present embodiment, it will be explained that the image sensor 22 includes the first to third sensors 221 to 223, but the image sensor 22 may be configured to include at least one of the first to third sensors 221 to 223. In addition, the image sensor 22 may be configured to include, for example, a sensor for generating a monochrome image instead of the first to third sensors 221 to 223.

In the present embodiment, an image generated based on the light transmitted through the lens 21 is an image affected by the aberration of the optical system (lens 21), and includes bokeh which occurs due to the aberration.

The image processing device 3 shown in FIG. 1 includes, as functional structures, a statistical model storage 31, an image acquisition module 32, a distance acquisition module 33, an output module 34, and a learning processing module 35.

In the statistical model storage 31, a statistical model used to acquire a distance to a subject from an image captured by the capture device 2 is stored. The statistical model stored in the statistical model storage 31 is generated by learning the bokeh which occurs in the image influenced by the above-described aberration of the optical system and which changes nonlinearly according to the distance to the subject in the image. According to such a statistical model, when the image is input to the statistical model, a bokeh value indicating the bokeh which is included in the image and which occurs in the image according to the distance to the subject can be predicted (output) as a predicted value corresponding to the image.

It is assumed that, for example, the statistical model can be generated by applying various types of known machine learning algorithms such as a neural network or a random forest. In addition, the neural network applicable to the present embodiment may include, for example, a convolutional neural network (CNN), a fully connected neural network, a recursive neural network and the like.

The image acquisition module 32 acquires an image captured by the above-described capture device 2 from the capture device 2 (image sensor 22).

The distance acquisition module 33 acquires distance information indicating the distance to the subject in the image, using the image acquired by the image acquisition module 32. In this case, the distance acquisition module 33 acquires the distance information based on the bokeh value output from the statistical model by inputting the image to the statistical model stored in the statistical model storage 31 (i.e., the bokeh value indicating the bokeh which occurs in the image according to the distance to the subject included in the image).

The output module 34 outputs the distance information acquired by the distance acquisition module 33 in, for example, a map format in which the distance information is positionally associated with the image. In this case, the output module 34 can output image data consisting of pixels in which the distance indicated by the distance information is a pixel value (in other words, output the distance information as the image data). When the distance information is thus output as the image data, the image data can be displayed as a distance image indicating the distance by, for example, colors. For example, the distance information output by the output module 34 can be used to calculate the size of the subject in the image captured by the capture device 2.

For example, the learning processing module 35 executes a process of causing the statistical model stored in the statistical model storage 31 to learn using the image acquired by the image acquisition module 32. The details of the process executed by the learning processing module 35 will be described later.

In the example shown in FIG. 1, it has been described that the image processing device 3 includes the modules 31 to 35 but, for example, the image processing device 3 may be composed of a ranging device which includes the image acquisition module 32, the distance acquisition module 33, and the output module 34, and a learning device which includes the statistical model storage 31, the image acquisition module 32, and the learning processing module 35.

FIG. 2 shows an example of a system configuration of the image processing device 2 shown in FIG. 1. The image processing device 3 includes a CPU 301, a nonvolatile memory 302, a RAM 303, and a communication device 304. In addition, the image processing device 3 further includes a bus 305 which mutually connects the CPU 301, the nonvolatile memory 302, the PAM 303, and the communication device 304.

The CPU 301 is a processor for controlling operations of various components in the image processing device 3. The CPU 301 may be a single processor or may be composed of a plurality of processors. The CPU 301 runs various programs loaded from the nonvolatile memory 302 into the RAM 303. These programs include an operating system (OS; and various application programs. The application programs include an image processing program 303A.

The nonvolatile memory 302 is a storage medium used as an auxiliary storage device. The RAM 303 is a storage medium used as a main storage device. The nonvolatile memory 302 and the RAM 303 alone are shown in FIG. 2, but the image processing device 3 may include, for example, the other storage device such as a hard disk drive (HDD) or a solid state drive (SDD).

In the present embodiment, the statistical model storage 31 shown in FIG. 1 is realized by, for example, the nonvolatile memory 302 or the other storage device.

In addition, in the present embodiment, it is assumed that some or all of the image acquisition module 32, the distance acquisition module 33, the output module 34 and the learning processing module 35 shown in FIG. 1 are realized by causing the CPU 301 (in other words, the computer of the image processing device 3) to run the image processing program 303A, i.e., by software. The image processing program 303A may be distributed while stored in a computer-readable storage medium and distributed, or may be downloaded into the image processing device 3 via a network.

It has been described that the image processing program 303A is executed by the CPU 301, but some or all of the modules 32 to 35 may be realized by using, for example, a GPU (not shown) instead of the CPU 301. In addition, some or all of the modules 32 to 35 may be realized by hardware such as an integrated circuit (IC) or a combination of software and hardware.

The communication device 304 is a device configured to execute wired communication or wireless communication. The communication device 304 includes a transmitter which transmits a signal and a receiver which receives a signal. The communication device 304 executes communication with an external device via a network and communication with an external device which exists around the communication device 304. The external device includes the capture device 2. In this case, the image processing device 3 can receive an image from the capture device 2 via the communication device 304.

The image processing device 3 may further include, for example, an input device such as a mouse or keyboard, and a display device such as a display, which are not omitted in FIG. 2.

Next, an outline of the operation or the ranging system 1 in the present embodiment will be described with reference to FIG. 3.

In the ranging system 1, the capture device 2 (image sensor 22) generates an image affected by the aberration of the optical system (lens 21) as described above.

The image processing device 3 (image acquisition module 32) acquires the image generated by the capture device 2 and inputs the image to the statistical model stored in the statistical model storage 31.

According to the statistical model in the present embodiment, the bokeh value (bokeh information) indicating the bokeh which occurs in the image in accordance with the di stance to the subject in the image input as described above is output. As described below, the distance to the Subject in the image is correlated with the color, size and shape of the bokeh which occurs in the image in accordance with the distance, and the image processing device 3 (distance acquisition module 33) can acquire the distance information indicating the distance to the subject by converting the bokeh value output from the statistical model into the distance. In the present embodiment, the bokeh value output from the statistical model is a scalar quantity representing the amount of bokeh including the color, size, and shape of the bokeh which occurs in the image.

Thus, in the present embodiment, the distance information can be acquired from the image captured by the capture device 2 by using the statistical model.

A principle of acquiring (the distance information indicating) the distance to the subject in the present embodiment will be described in brief with reference to FIG. 4.

The bokeh caused by the aberration (lens aberration) of the optical system of the capture device 2 is generated in an image captured by the capture device 2 (hereinafter referred to as a captured image) as described above. More specifically, since the refractive index of light transmitted through the lens 21 having aberration differs depending on the wavelength band, light beams of respective wavelength bands are not concentrated at one point but reach different points in a case where, for example, the position of the subject is displaced from the focal position (i.e., the position focused in the capture device 2). This emerges as bokeh (chromatic aberration) on the image.

In addition, in the captured image, the bokeh (color, size and shape) changing nonlinearly in accordance with the distance to the subject in the captured image (i.e., the position of the subject with respect to the capture device 2) is observed.

For this reason, in the present embodiment, bokeh (bokeh information) 402 which occurs in a captured image 401 as shown in FIG. 4 is analyzed as a physical clue related to the distance to a subject 403 in a statistical model, and a distance to the subject. 403 is thereby acquired.

More specifically, the statistical model in the present embodiment predicts (estimates) the bokeh 402 which occurs in the image 401 by inputting the image 401 and, in the present embodiment, the distance to the subject 403 in the captured image 401 can be acquired by convert in the bokeh 402 into the distance to the subject 403.

The bokeh value predicted in the statistical model will be concretely described with reference to FIG. 5.

The absolute value of the size (pixels) of the bokeh which occurs in the captured image becomes larger as the subject is farther from the focal position in both cases where the subject position is closer than the focal position and where the subject position is farther than the focal position. In contrast, the color and shape of the boke differ in a case where the subject position IS closer to the focal position and a case where the subject position is farther from the focal position.

For this reason, in the present embodiment, it is assumed that the bokeh value indicating (the color, size and shape of the bokeh) of the bokeh which occurs in a case where the subject is closer than the focal position (i.e., the subject is located at a front position) is indicated by a negative value, and that the bokeh value indicating (the color, size and shape) of the bokeh which occurs in a case where the subject is farther than the focal position (i.e., the subject is located at a back position) is indicated by a positive value.

In other words, in the statistical model in the present embodiment, a small value is predicted as the bokeh value when the distance to the subject is short, and a large value is predicted as the bokeh value when the distance to the subject is long.

An example of a method of predicting (the bokeh value indicating) the bokeh which occurs in the captured image in accordance with the distance from the captured image to the subject in the statistical model will be described below with reference to FIG. 6. A patch method will be described here.

Figure 6:
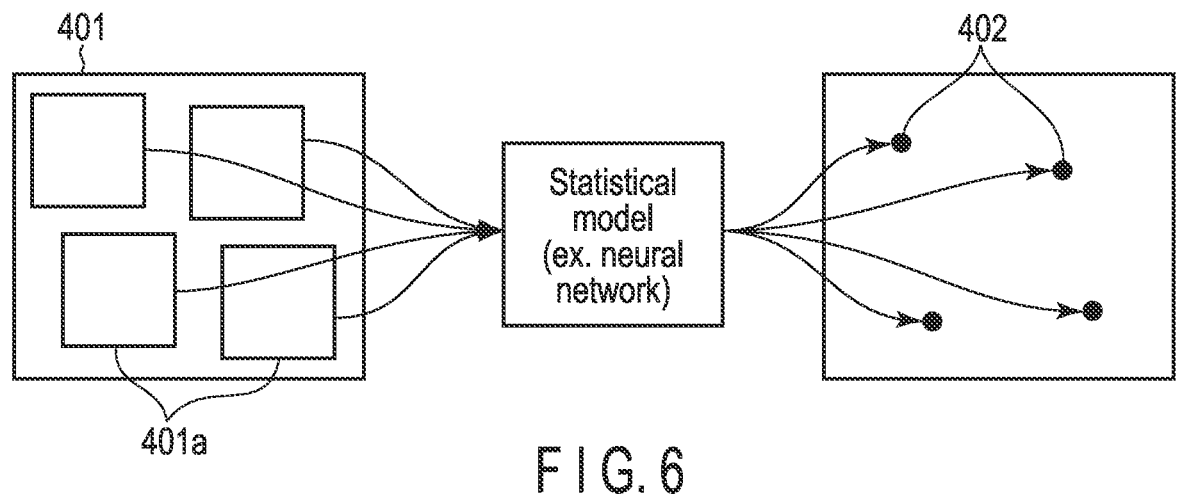
FIG. 6 is a diagram illustrating an example of a method of predicting bokeh from a captured image.

As shown in FIG. 6, local areas (hereinafter referred to as image patches) 401*a* are cut out (extracted) from the captured image 401 in the patch method.

In this case, for example, the entire area of the captured image 401 may be divided into a matrix and the divided partial areas may be sequentially cut out as the image patches 401*a* or the captured image 401 may be recognized and the image patches 401*a* may be cut out to cover the area in which a subject (image) is detected. An image patch 401*a* may partially overlap the other image patch 401*a*.

In the patch method, the bokeh value is output as a predicted value corresponding to the image patch 401*a* cut out as described above. In other words, bokeh 402 generated in the subject included in each of the image patches 401*a* is predicted by inputting the information on each of the image patches 401*a* cut out from the captured image 401, in the patch method.

Figure 7:
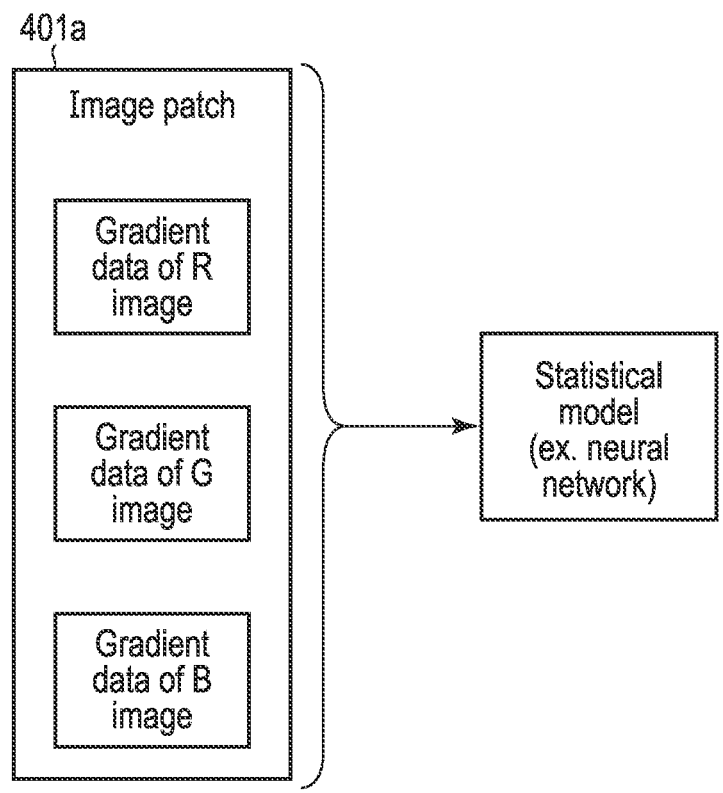
FIG. 7 is a diagram showing an example of information relating to an image patch.

FIG. 7 shows an example of information on the image patch 401*a* input to the statistical model in the above-described patch method.

In the patch method, the gradient data (gradient data of R image, gradient data of G image, and gradient data of B image) of the image patch 401*a* cut out from the captured image 401 is generated for each of an R image, a G image, and a B image included in the captured image 401. The gradient data thus generated is input to the statistical model.

The gradient data corresponds to a difference (difference value in pixel value between each pixel and a pixel adjacent to this pixel. For example, when the image patch 401a is extracted as a rectangular area of n pixels (X-axis direction)×m pixels (Y-axis direction), gradient data in which the difference values from, for example, adjacent pixels on the right side as calculated with respect to each pixel included in the image patch 401a are arranged in a matrix of n rows×m columns is generated.

The statistical model predicts bokeh generated in the pixels, by using the gradient data of an R image, the gradient data of a G image and the gradient data of a B image. FIG. 7 shows a case where the gradient data of each of an F image, a G image and a B image is input to the statistical model, but the gradient data of an RGB image may be input to the statistical model.

When the gradient data of each pixel is input to the statistical model as described above, the statistical model outputs the bokeh value for each pixel.

In the present embodiment, (the bokeh value indicating) the bokeh which occurs in the image can be predicted according to the distance from the image to the subject included in the image by using the statistical model as described above, but the statistical model needs to be caused to learn to improve the accuracy of the bokeh value.

Figure 8:
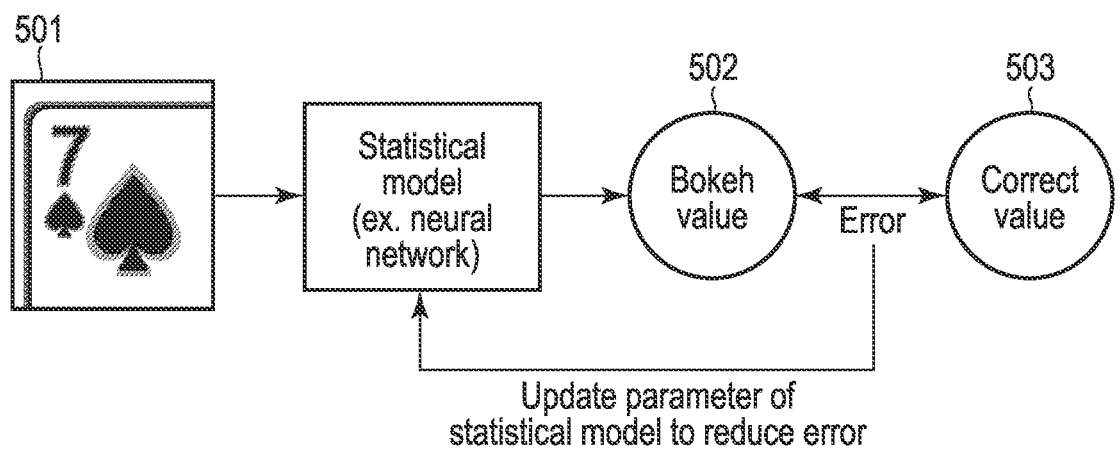
FIG. 8 is a diagram illustrating an outline of a general statistical model learning method.

An outline of a general statistical model learning method will be described below with reference to FIG. 8. Learning the statistical model is executed by inputting information on an image (hereinafter referred to as a learning image) 501 prepared for the learning to the statistical model and feeding back an error between a bokeh value 502 predicted by the statistical model and a correct value 503 to the statistical model. The correct value 503 is a bokeh value indicating the bokeh which occurs in the learning image 501 in accordance with the actual di stance (measured value) from the capturing point of the learning image 501 to the subject included in the learning image 501 (i.e., a bokeh value obtained by converting the actual distance), and is also referred to as, for example, a correct answer label or the like. In addition, the feedback is indicative of updating a parameter (for example, a weight coefficient) of the statistical model to reduce the error.

More specifically, when the above-described patch method is applied as a method of predicting the bokeh value from the capture device in the statistical model, information (gradient data) on the image patch is input to the statistical model for each image patch (local area) cut out from the learning image 501, and the bokeh value 502 is output as the predicted value corresponding to each image patch by the statistical model. The error obtained by comparing the bokeh value 502 thus output with the correct value 503 is fed back to the statistical model.

Figure 9:
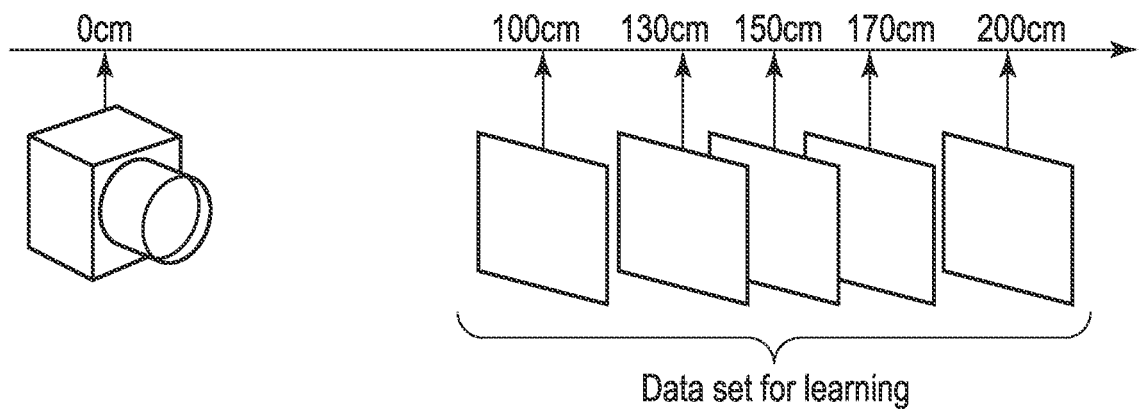
FIG. 9 is a diagram illustrating a data set for learning.

Incidentally, for example, a learning image assigned a correct answer label as shown in FIG. 9 (i.e., a learning data set including both the learning image and the corrector answer value obtained by converting the actual distance which is to be predicted from the learning image) needs to be prepared in the above-described general statistical model learning method and, to obtain the correct answer label, the actual distance to the subject included in the learning image needs to be measured every time the learning image is captured. Since a large number of learning data sets need to be learned by the statistical model to improve the accuracy of the statistical model, preparing such a large number of learning data sets is not easy.

The loss (error) calculated based on the bokeh value output from the statistical model by inputting the learning image (image patch) needs to be evaluated (fed back) in the learning of the statistical model and, in the present embodiment, it is assumed that weakly supervised learning is executed based on rank loss calculated using a relationship in length between distances to subjects included in the learning images.

The weakly supervised learning based on rank loss is a method of learning based on a relative relationship in order (rank) between data. In the present embodiment, it is assumed that the statistical model is caused to learn based on the rank of each of the two images based on the distances relative distances) from the capture device 2 to the subjects.

According to such a learning method, if the relationship in length between the distances to the subjects included in the learning images is known, the actual measured values of the distances (actual distances) may be unknown.

Figure 10:
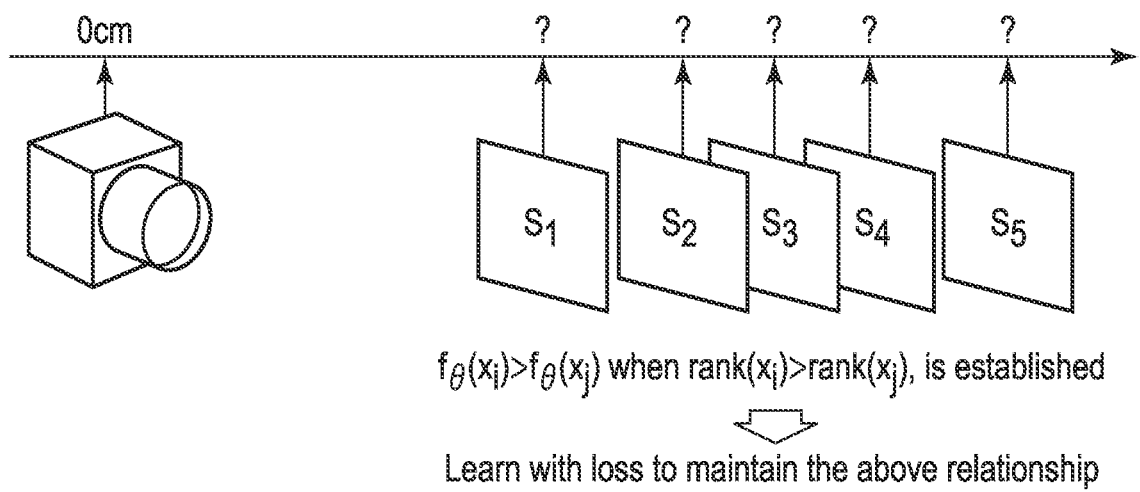
FIG. 10 is a diagram illustrating an outline of a statistical model learning method according to the embodiment.

The actual distance from the capture device 2 is unknown as shown in FIG. 10, but it is assumed that the relationship in length (rank) between the distances to five subjects $S_1$ to $S_5$ is known. The subject $S_1$ of the subjects $S_1$ to $S_5$ is located at a closest position to the capture device 2, and the subject $S_5$ is located at a farthest position from the capture device 2. When each of the subjects $S_1$ to $S_5$ is captured by the capture device 2 and images including the subjects $S_1$ to $S_5$ are referred to as images $x_1$ to $x_5$, respectively, ranks of the images according to the distances to the subjects $S_1$ to $S_5$ included in the respective images $x_1$ to $x_5$ are "1" for the image $x_1$, "2" for the image $x_2$, "3" for the image $x_3$, "4" for the image $x_4$, and "5" for the image $x_5$.

It is assumed that in the images $x_1$ to $x_5$, for example, the bokeh value indicating the bokeh which occurs in image $x_2$ according to the distance to the subject $S_2$ in image $x_2$ and the bokeh value that indicates the bokeh which occurs in image $x_5$ depending on the distance to the subject S in image $x_5$ is predicted using a statistical model.

In this case, according to the relationship between the distance and the bokeh value as described above in FIG. 5, if sufficient learning is executed and a statistical model having a high accuracy is used, the bokeh value output from the statistical model by inputting the image $x_2$ should be smaller than the bokeh value output from the statistical model by inputting the image $x_5$.

Thus, in the present embodiment, for example, it is assumed that the relationship in length between a distance to a subject included in an image $x_i$ (i.e., the distance from the capture device 2 to the subject upon capturing the image $x_i$) and a distance to a subject included in an image $x_j$ (i.e., the distance from the capture device 2 to the subject upon capturing the image $x_j$ is discriminated and that the statistical model is caused to learn using the loss rank loss) which maintains the relationship, on the assumption that a relationship "$f_\theta(x_i) > f_\theta(x_j)$ when rank $(x_i) > \text{rank}(x_j)$" is established.

Incidentally, rank $(x_i) > \text{rank}(x_j)$ indicates that the distance to the subject included in the image $x_i$ is longer than the distance to the subject included in the image $x_j$. In addition, $f_\theta(x_i)$ refers to the bokeh value $f_\theta(x_i)$ output from the statistical model $f_\theta$ by inputting the image $x_i$ (i.e., a predicted value corresponding to the image $x_i$, and $f_\theta(x_j)$ refers to the bokeh value $f_\theta(x_j)$ output from the statistical model $f_\theta$ by inputting the image $x_j$ (i.e., a predicted value corresponding to the image $x_j$). In addition, $\theta$ in $f_\theta$ is a parameter or the statistical model.

In FIG. 9 and FIG. 10, the subjects having a flat shape are shown for convenience, but the subjects may be other objects having the other shape, or the like.

Figure 11:
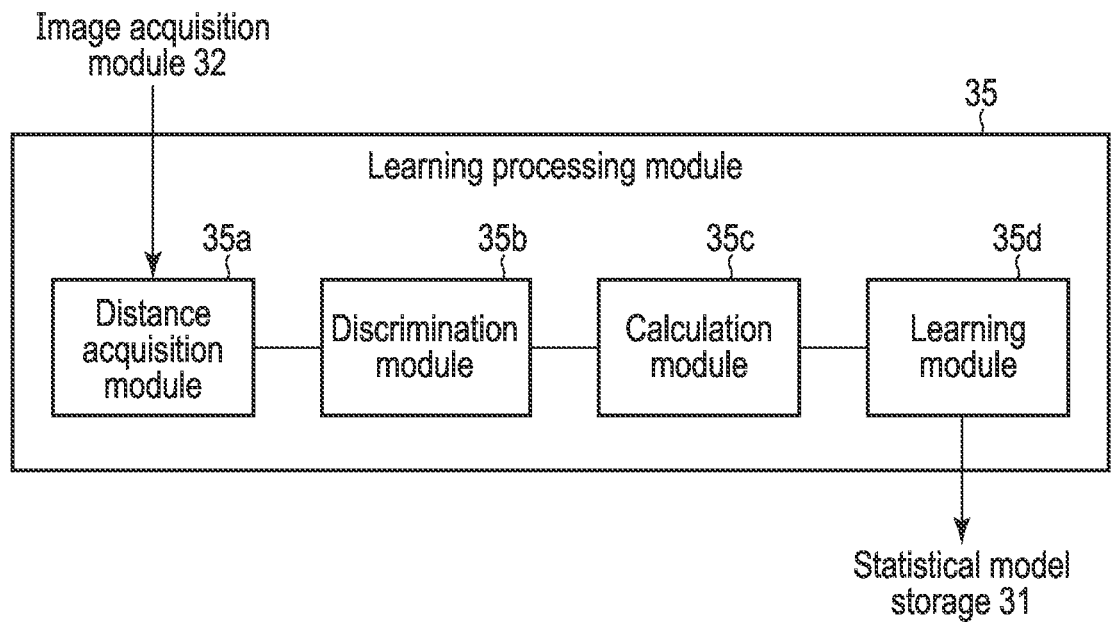
FIG. 11 is a block diagram showing an example of a functional configuration of a learning processing module.

The learning processing module 35 included in the image processing device 3 shown in FIG. 1 will be specifically described below. FIG. 11 is a block diagram showing an example of the functional configuration of the learning processing module.

As shown in FIG. 11, the learning processing module 35 includes a distance acquisition module 35a, a discrimination module 35b, a calculation module 35c, and a learning module 35d.

In the present embodiment, weakly supervised learning based on rank loss calculated using a plurality of learning images is executed and, to execute such learning, the relationship in length between the distances to the subjects included in the plurality of learning images needs to be discriminated as described above.

Figure 12:
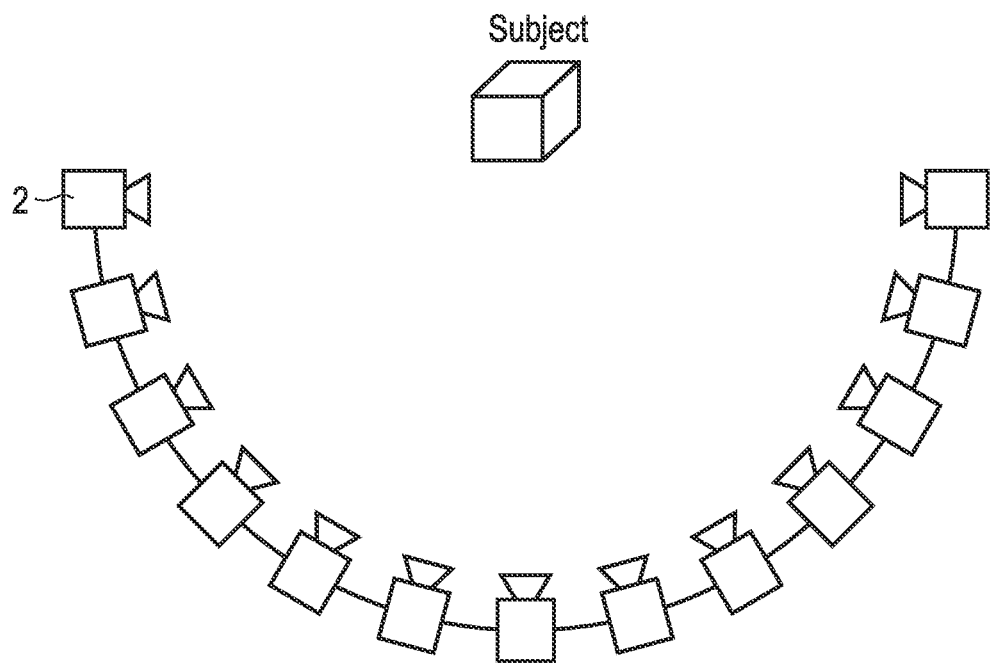
FIG. 12 is a view illustrating a multi-view image.

In this case, it is assumed that the image acquisition module 32 acquires multi-view images captured by the capture devices 2. The distance acquisition module 35a acquires the multi-view images from the image acquisition module 32 and acquires the distances (depths) from the acquired multi-view images to the subjects included in the respective multi-view images. The multi-view images in the present embodiment are a plurality of images (two or more images) obtained by capturing the same subject from different viewpoints (i.e., multiple viewpoints) shown in FIG. 12. Details of the distances acquired by the distance acquisition module 35a will be described later.

The discrimination module 35b discriminates the relationship in length between the distances to the subjects included in, for example, two images of the multi-view images (hereinafter simply referred to as a relationship in length of the distances between the images), based on the distances acquired by the distance acquisitions module 35a.

The calculation module 35c calculates; the rank loss, based on the bokeh value output by inputting each of the two images whose relationship in length is discriminated by the discrimination module 35b to the statistical model and the relationship in length of distances between the images discriminated by the discrimination module 35b.

The learning module 35d causes the statistical model stored in the statistical model storage 31 to learn based on the rank loss calculated by the calculation module 35c. The statistical model for which learning of the learning module 35d is completed is stored in the statistical model, storage 31 (i.e., overwritten to the statistical model stored in the statistical model storage 31).

Next, an example of a procedure of the image processing device 3 upon causing the statistical model to learn will be described with reference to the flowchart in FIG. 13.

It is assumed that the statistical model learned in advance (preliminarily learned model is stored in the statistical model storage 31 but, for example, the statistical model may be generated by learning the images captured by the capture device 2 or generated by learning the images captured by a capture device (or lens) different from the capture device 2. In other words, in the present embodiment, at least a statistical model for inputting the image and outputting (predicting) a bokeh value indicating bokeh which occurs in the image according to a distance to a subject included in the image (i.e., a bokeh value corresponding to the distance) may be prepared in advance.

First, the distance acquisition module 35a acquires the multi-view images acquired by the image acquisition module 32 (i.e., the images obtained by capturing the subject captured by the capture device 2 from multiple viewpoints) as a learning image set (step S1). The multi-view images acquired in step S1 are desirably the images obtained by capturing the same subject that stands still as much as possible from mutually different positions. In addition, in the present embodiment, the multi-view images (plural images) are assumed to be captured in a state in which focuses of the capture devices 2 (i.e., focal positions based on the distance between the lens 21 and the image sensor 22) are fixed, and are desirably captured such that various bokeh occurs in the subjects.

The capture devices 2 which capture the multi-view images may be any camera systems to which arbitrary lenses are attached, and do not need to be capture devices which capture the images whose bokeh is learned in advance by the above-described statistical model.

When the process of step S1 is executed, the distance acquisition module 35a acquires the distances to the subjects included in the respective multi-view images (i.e., the distances from the capture devices 2 to the subjects upon capturing the images) from the multi-view images acquired in step S1 (step S2).

Incidentally, techniques referred to as Structure from Motion (SfM) and multi-view stereo can be used for acquisition (depth estimation) of the distances from the multi-view images in step S2.

Figure 14:
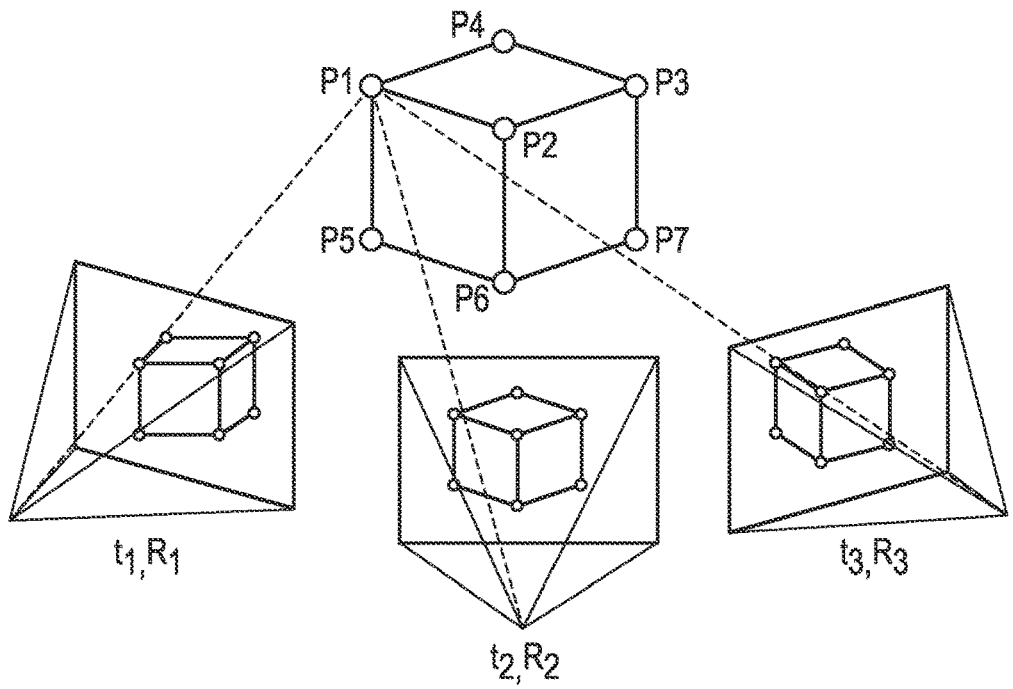
FIG. 14 is a view showing an outline of SfM.

FIG. 14 shows an overview of. SfM. In SfM, subject feature points (i.e., feature points representing the shapes of the subjects) are extracted from each of the multi-view images (i.e., multiple images captured from multiple viewpoints). In FIG. 14, P1 to P7 are extracted as the subject feature points from three images. The feature points thus extracted are made to be associated in the multi-view images. According to SfM, the positions and attitudes of the capture devices 2 upon capturing the images (i.e., the positions and attitudes of the capture devices 2 at the respective viewpoints) can be calculated based on (coordinates of) three-dimensional point group on the feature points thus associated, and displacements between the associated feature points. In SfM, the displacement of the coordinates of the three-dimensional point group can be minimized by using the multi-view images Since the coordinates of the coarse three-dimensional point group are calculated in SfM, it is assumed in the present embodiment that (coordinates of) a more detailed three-dimensional point group are/is calculated by the multi-view stereo technology using the positions and attitudes of the capture devices 2 at the respective viewpoints as described above.

In this case, when a position (translational component) and an attitude (rotational component) of one viewpoint (capture device 2) in SfM and multi-view stereo technology described above are referred to as t and R and coordinates of a three-dimensional point calculated from a multi-view image are referred to as (X, Y, Z), coordinate positions (x, y) in the multi-view image (i.e., the image a each viewpoint) and a distance (depth) zo to a subject which exists at the coordinate Position have the following relationships of expressions (1) and (2).

$$\begin{pmatrix} x' \\ y' \\ z_0 \end{pmatrix} = K[R \mid t] \begin{pmatrix} X \\ Y \\ Z \\ 1 \end{pmatrix}$$

Expression (1)

-continued $$\begin{pmatrix} x \\ y \end{pmatrix} = \begin{pmatrix} \frac{x'}{z_0} \\ \frac{y'}{z_0} \end{pmatrix} \qquad \text{Expression (2)}$$

K in expression (1) refers to an internal parameter of the capture device 2 and includes, for example, the distance between the lens 21 and the image sensor 22 provided in the capture device 2.

In step S2, the distance to the subject included in each of the multi-view images is calculated for each of the above-described feature points by using the above expressions (1) and (2).

However, the distance acquired (calculated) above in step S2 is a distance of an unknown scale. The distance zo of an unknown scale and the distance z based on the real scale have a relationship of the following expression (3).

$$z = \beta z_\theta \qquad \text{Expression (3)}$$

In the above expression (3), β is a scale parameter for converting the distance zo of an unknown scale into the distance z based on a real scale. In general, the scale parameter β cannot be obtained only from the information of the capture device 2 (monocular camera), without information (advance information) on the size of the subject included in the Image, information (values) obtained from other sensors, or the like.

Figure 15:
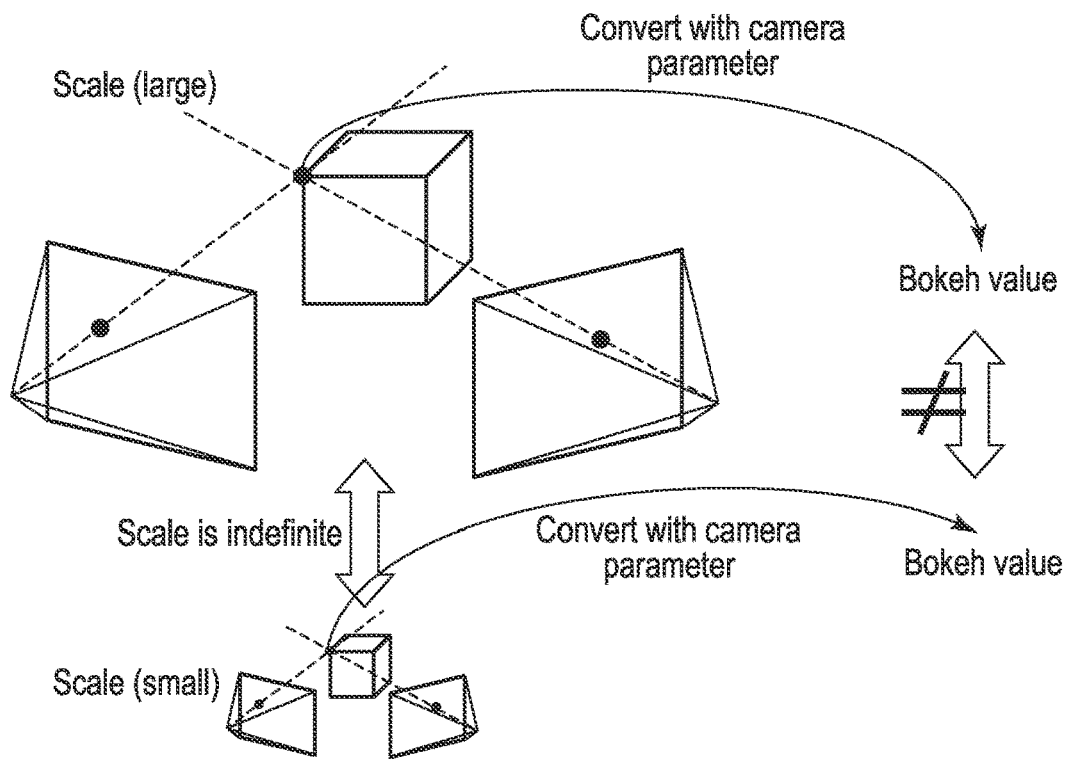
FIG. 15 is a view illustrating a relationship between a scale parameter and a bokeh value.

The bokeh value into which the distance (measured value) based on the real scale is converted using a camera parameter is used as a correct value upon learning a general statistical model. In a case where the scale parameter β is thus unknown, for example, when the subject is captured from the same distance as shown in FIG. 15, the distance may be converted Into the bokeh value of different d stances and the statistical model cannot be caused to appropriately learn (i.e., the bokeh value into which the distance zo of an unknown scale is converted cannot be used as a correct value).

However, the distance zo of an unknown scale to the subject (feature point) included in each of the multi-view images can be used to discriminate the relationship in length of the distances to the subjects.

Next, the learning processing module 35 selects (acquires) at random, for example, two arbitrary images from among the multi-view images (plural learning images) acquired in step S1 (step S3). In the following descriptions, two images selected in step S3 are referred to as images $x_i$ and $x_j$.

It is assumed that the images $x_i$ and $x_j$ selected in step S3 are, for example, at least several areas (for example, image patches of n pixels×m pixels) cut out from (any image of) the multi-view images. In addition, the images $x_i$ and $x_j$ may be image patches cut out from the same image of the multi-view images or image patches cut out from different images.

Next, the discrimination module 35b discriminates the relationship in length between distances to the images $x_i$ and $x_j$ selected in step S3 (i.e., the relationship in length between the distances to the subjects included in each of the images $x_i$ and $x_j$), based on the distance of an unknown scale to the subject included in each of the multi-view images acquired in step S2 (step S4).

Since the distance is calculated for each of the feature points included in each of the multi-view images in step S2, it is assumed in step S3 that the image patches including the feature points are selected as the image $x_i$ and the image $x_j$.

The relationship in length between the distances to the images $x_i$ and $x_j$ is thereby discriminated based on the distances calculated for the feature points included in each of the images $x_i$ and $x_j$.

More specifically, for example, when the image patch including a feature point P2 in the image shown in the lower central part of FIG. 14 is the image $x_i$ and the image patch including a feature point P4 in the image is the image $x_j$, the relationship in length between the distances to the images $x_i$ and $x_j$ that the distance to the subject (feature point P2) included in the image $x_i$ is longer than the distance to the subject (feature point P4) included in the image $x_j$, is discriminated.

For convenience, it has been described that the image patches cut out from the same image are the images $x_i$ and $x_j$, but the distance is calculated for each feature point included in each of the multi-view images in step S2 as described above, and the relationship in length between the distances to the images $x_i$ and $x_j$ can be discriminated even if the images $x_i$ and $x_j$ are the image patches cut out from different images of the multi-view images.

When the process of step S4 is executed, the calculation module 35c acquires the bokeh value (predicted value) indicating the bokeh which occurs in the image $x_i$ in accordance with the distance to the subject included in the image $x_i$ and the bokeh value (predicted value) that occurs in accordance with the distance to the subject included in the image $x_j$, based on the statistical model stored in the statistical model storage 31 (step S5).

In this case, the bokeh value $f_\theta(x_i)$ output from the statistical model by inputting the image $x_i$ (i.e., the image patch of n pixels×m pixels), and the bokeh value $f_\theta(x_j)$ output from the statistical model inputting the image $x_j$ (i.e., the image patch of n pixels×m pixels) are acquired.

Next, the calculation module 35c calculates the rank loss (i.e., the loss considered based on the relationship in length between the distances to the images $x_i$ and $x_j$), based on the bokeh values obtained in step S5 (hereinafter referred to as a bokeh value of the image $x_i$ and a bokeh value of the image $x_j$) (step S6).

In step S6, the loss (rank loss) is calculated, reflecting a result of discriminating whether or not the relationship in magnitude between the bokeh value $f_\theta(x_i)$ of the image $x_i$ and the bokeh value $f_\theta(x_j)$ of the image $x_j$ is equal to the relationship in length between the distances to the images $x_i$ and $x_j$ which has been discriminated in step S4.

According to, for example, "Chris Burges, Tal Shaked, Erin Renshaw, Ari Lazier, Matt Deeds, Nicole Hamilton, and Greg Hullender. Learning to rank using gradient descent. In Proceedings of the 22nd international conference on Machinelearning, pages 89-96, 2005.", a function indicating the rank loss (rank loss function) is defined by the following expression (4).

$$L_{rank}(x_i, x_j) = \qquad \text{Expression (4)}$$
$$-y_{ij}(f_\theta(x_j) - f_\theta(x_i)) + \text{softplus}\,(f_\theta(x_j) - f_\theta(x_i))$$

$$Y_{ij} = \begin{cases} 1 & \text{if rank}\,(x_j) > \text{rank}\,(x_i) \\ 0 & \text{if rank}\,(x_j) < \text{rank}\,(x_i) \\ 0.5 & \text{otherwise} \end{cases} \qquad \text{Expression (5)}$$

$$\text{softplus}\,(x) = \log(1 + e^x) \qquad \text{Expression (6)}$$

In this expression (4), $L_{rank}(x_i, x_j)$ indicates the rank loss, and $y_{ij}$ corresponds to a label indicating whether or not the relationship in magnitude between the bokeh value $f_θ(x_i)$ of the image $x_i$ and the bokeh value $f_θ(x_j)$ of the image $x_j$ is equal to the relationship in length between the distances to the images $x_i$ and $x_j$ (i.e., the bokeh values which are the predicted values of the statistical model satisfy the relationship discriminated in step S4). As shown in expression (5), $y_{ij}$ is 1 when rank($x_i$)>rank($x_j$) (i.e., the distance to the subject included in the image $x_i$ is longer than the distance to the subject included in the image $x_j$), and 0 when rank($x_i$)<rank($x_j$) (i.e., the distance to the subject included in the image $x_i$ is shorter than the distance to the subject included in the image $x_j$). In addition, otherwise of expression (5) assumes a case where rank($x_i$)=rank ($x_j$) (i.e., the distance to the subject included in the image $x_i$ is equal to the distance to the subject included in the image $x_j$) and, in this case, $y_{ij}$ is set to 0.5. rank($x_i$)>rank($x_j$), rank($x_i$)<rank($x_j$), and otherwise correspond to the results of discrimination of the relationship in length between the distances to the images $x_i$ and $x_j$ in step S5.

In addition, softplus in expression (4) is a function referred to as softplus, which is used as an activation function, and is defined similarly to expression (6).

According to the rank loss function, (the value of) the rank loss calculated becomes small when the relationship in magnitude between the bokeh values of the respective images $x_i$ and $x_j$ (i.e. the relationship in bokeh value between the images $x_i$ and $x_j$) equal to the relationship in length between the distances to the images $x_i$ and $x_j$, and (the value of) the rank loss calculated becomes large when the relationship in magnitude between the bokeh values of the respective images $x_i$ and $x_j$ is not equal to the relationship in length between the distances to the images $x_i$ and $x_j$.

Next, the learning module 35d causes the statistical model to be learned using the rank loss calculated in step S6, and updates the statistical model (step S7. Learning the statistical model is executed by updating the parameter θ of the statistical model, and updating the parameter θ is executed according to an optimization problem such as expression (7).

$$θ' = \underset{θ}{\operatorname{argmin}} \sum_{x_i, x_j \in N} L_{rank}(x_i, x_j) \qquad \text{Expression (7)}$$

In expression (7), N refers to the above-described multi-view images (i.e., the set of learning images). Although omitted in FIG. 13, the processes of steps S3 to S7 are assumed to be executed for each pair of two images $x_i$ and $x_j$ selected from the multi-view images N (i.e., two image patches cut out from the multi-view images N).

In this case, according to expression (7), a parameter θ' at which the sum of the rank loss $L_{rank}(x_i, x_j)$ calculated for each pair of images $x_i$ and $x_j$ is the smallest (i.e., the updated parameter) can be obtained.

When a neural network, a convolutional neural network, or the like is applied to the statistical model in the present embodiment (i.e., the statistical model is composed of a neural network, a convolutional neural network, or the like), the error back propagation method of calculating the above expression (7) in a reverse direction is used for learning the statistical model (i.e., updating the parameter θ). According to the error back propagation method, the gradient of the rank loss is calculated and the parameter θ is updated according to the gradient.

In step S7, the statistical model can be caused to learn the multi-view images acquired in step S7 by updating the parameter θ of the statistical model to the parameter θ' obtained using the above expression (7). The statistical model in which the parameter is thus updated is stored in the statistical model storage 31 (i.e., the statistical model is updated).

In the present embodiment, for example, the processes shown in FIG. 13 are executed for a predetermined number of pairs of images $x_i$ and images $x_j$, but the statistical model may be further learned by repeating the processes shown in FIG. 13.

In addition, the learning method using the above-described rank loss function as shown in expression (4) is referred to as Rank Net, but the statistical model may be learned by other learning methods in the present embodiment. More specifically, for example, FRank, RankBoost, Ranking SVM, IR SVM, or the like may be used as the statistical model learning method according to the present embodiment. That is, in the present embodiment, various loss functions can be used if the statistical model is caused to learn such that the relationship in magnitude between the bokeh values of the images $x_i$ and $x_j$ is equal to the relationship in length between the distances to the images $x_i$ and $x_j$ (i.e., learning is executed under constraints on t rank of each of the learning images).

In step S3 shown in FIG. 13, it has been described that the image patches (i.e., the partial image areas) cut out from the multi-view images are selected as the images $x_i$ and $x_j$, but the area occupying the entire image (i.e., the entire image) may be selected as the images $x_i$ and $x_j$. In this case, for example, in step S4, the relationship may be discriminated based on the distance calculated for one feature point included in the image $x_i$ and one feature point included in the image $x_j$, in step S4, and the bokeh value output for the image corresponding to the feature point, among the bokeh values output from the statistical model for each of the pixels constituting the images $x_i$ and $x_j$, may be acquired in step S5.

Next, an example of the procedure of the image processing device 3 upon acquiring the distance information from the captured image using the statistical model that is caused to learn the multi-view images (i.e., the set of learning images) by executing the processes shown in FIG. 13 will be described with reference to a flowchart in FIG. 16.

First, the capture device 2 (image sensor 22) captures a subject for which the distance from the Capture device 2 is to be measured, to generate a captured image including the subject. The captured image is affected by the aberration of the optical system (i.e., the lens 21) of the capture device 2 as described above.

The image acquisition module 32 included in the image processing device 3 acquires the captured image from the capture device 2 (step S11).

Next, the distance acquisition module 33 inputs the information on the captured image i.e., each of the image patches) acquired in step S11 to the statistical model stored in the statistical model storage 31 (step S12). The information on the captured image that is input to the statistical model in step S12 includes the gradient data of each of the pixels constituting the captured image.

When the process of step S12 is executed, a bokeh value indicating the bokeh which occurs in accordance with the distance to the subject is predicted in the statistical model, and the statistical model outputs the predicted bokeh value. The distance acquisition module 33 thereby acquires the bokeh value output from the statistical model (step S13). In step S13, the bokeh value for each of the pixels constituting the captured image acquired in step S11 is acquired.

When the process of step S13 is executed, the distance acquiring module 33 converts the bokeh value acquired in step S13 into the distance corresponding to the bokeh value (step S14).

When the bokeh value is b (=$f_\theta(x)$) and the distance to the subject (i.e., the distance based on a real scale) is z, the distance acquisition module 33 can calculate the distance from the bokeh value acquired in step 313 using the expression (8), since the bokeh value b and the distance z have the following relationship of expression (8).

$$b = \frac{fv}{2pF}\left(\frac{1}{f} - \frac{1}{z} - \frac{1}{v}\right) \qquad \text{Expression (8)}$$

In expression (8), f refers to a focal distance, v refers to a distance between the lens 21 provided in the capture device 2 and the image sensor 22, p refers to a pixel pitch, and F refers to an aperture (value).

As described above, since the bokeh value for each pixel constitute the captured image is acquired in step S13, the process of step S14 is executed for the bokeh value of each pixel. In other words, in step S14, the bokeh value is converted into a distance for each pixel constituting the captured image. It is assumed that in a case where the process of step S14 is executed, the parameters (focal distance f of the capture device 2, the distance v between the lens 21 and, the image sensor 22, the pixel pitch p, and the aperture F) necessary for converting the bokeh value into the distance are obtained in advance.

When the process of step S14 is executed, the output module 34 outputs the distance information indicating the distance into which the bokeh value is converted in step S14 in, for example, the map format in which the distance information is disposed to be positionally associated with the captured image (step S15). In the present embodiment, it has been described that the distance information is output in the map format, but the distance information may be output in the other format.

According to the configuration that converts the bokeh value output from the statistical model into the distance as described here, an appropriate response to captured images which are captured in various environments can be made by calibrating the distance at the conversion, thereby improving the versatility.

As described above, in the present embodiment, the multi-viewpoint images (a plurality of images) are acquired by capturing the subject from multiple viewpoints by the imaging device, and the statistical model is caused to learn based on the bokeh value (first bokeh value) output from the statistical model by inputting the image $x_i$ (first image) of the multi-viewpoint images and the bokeh value (second bokeh value) output from the statistical model by inputting the image $x_j$ (second image) of the multiple viewpoint images. In addition, in the present embodiment, the distance (first distance) from the capture device 2 capturing the image $x_i$ to the subject included in the image $x_i$ and the distance (second distance) from the capture device 2 capturing the image $x_j$ to the subject included in the image $x_j$ are acquired from the multi-view images, the relationship in length between the distances to the images $x_i$ and $x_j$ (i.e., the relationship in length between the first distance and the second distance) is discriminated, and the statistical model, is caused to learn such that the relationship in magnitude of bokeh value between the images $x_i$ and $x_j$ (i.e., the relationship in magnitude between the bokeh value of the image $x_i$ and the bokeh value of the image $x_j$) is equal to the relationship in length between the distances to the images $x_i$ and $x_j$.

In the present embodiment, this configuration allows the statistical model to learn even on the images for learning that are not assigned correct answer labels (instruction labels), thus improving the easiness of learning in the statistical models.

In addition, in the present embodiment, when causing the statistical model to learn the images $x_i$ and $x_j$, the relationship in length between the distance to the subject included in the image $x_i$ and the distance to the subject included in the image $x_j$ (i.e., the distance in length between the distances to the images $x_i$ and $x_j$) needs to be recognized, but the relationship in length is automatically discriminated based on the distance to the subject included in each image, which is calculated from the multi-view images obtained by capturing the same subject from different viewpoints. According to this configuration, work of manually confirming the above-described relationship in length between the distances to the subjects included in the respective images $x_i$ and $x_j$ does not need to be performed, and the user can cause the statistical model to learn by only preparing the multi-view images.

Furthermore, since the multi-view images in the present embodiment need only to be a plurality of images obtained by capturing the same subject from multiple viewpoints, a special environment for capturing the multi-view images does not need to be prepared. In this case, the multi-view images may be a plurality of images automatically captured by, for example, a capture device 2 (camera) mounted on a drone or the like. According to this, difficulty of preparing the learning images can be further reduced.

In addition, the multi-view images may be, for example, images compressed (encoded) according to a predetermined format (i.e., images that lack predetermined information). It the present embodiment, a statistical model applicable to a more practical data format can be obtained by causing the statistical model to learn the multi-view images.

In the present embodiment, it is assumed that the multi-view images are captured with the focus of the capture device 2 (i.e., the distance between the lens 21 and the image sensor 22) fixed. According to this configuration, the statistical model can be caused to learn appropriately by maintaining the relationship between the distances acquired from the multi-view images and the bokeh which occurs in the multi-view images, and the multi-view images in which various types of bokeh occurs can be captured comparatively easily. The focus of the capture device 2 may be automatically set as a learning image mode, for example, when the user captures multi-view images with the capture device 2.

Furthermore, since it is desirable to learn various types of bokeh that occurs in the multi-view images, in the present embodiment, for example, image patches (fourth and fifth images) of images captured from viewpoints different from those of the images $x_i$ and $x_j$ may be selected after causing the statistical model to be learned based on the bokeh values output from the statistical model by inputting the images $x_i$ and $x_j$, and the statistical model may be caused to learn based on the bokeh values (fourth and fifth bokeh values) output from the statistical model by inputting the image patches. In other words, in the present embodiment, for example, (the color, size, and shape of) the bokeh different depending on the viewpoints for the same subject can be learned efficiently.

In addition, the present embodiment is configured to learn various types of bokeh that occurs in the multi-view images as described above and, for example, when the user captures multi-view images with the capture device 2, the user may be notified that various positions (a plurality of positions) from the front to the back should be focused (in other words, the user may be guided to capture in accordance with the focus condition of the edges of the subject). In this case, for example, by notifying the user of the focused positions, the user can capture the multi-view images while focusing various positions.

In addition, since multi-view images are a plurality of images obtained by capturing the same subject from multiple viewpoints, the user may be notified that the images including the subject should be captured (i.e., the user may be guided to capture the same subject) while the multi-view images (a plurality of images) are captured by the user. In this case, for example, it is possible to warn the user of a state in which the subject is not included in the images captured by the user.

The above-described notification can be made for the user via, for example, the capture device 2, but may be made by other methods.

Moreover, the bokeh which occurs in the images due to the aberration of the optical system has position dependency (i.e., the color, size, shape, and the like of the bokeh are different depending on the positions in the images) and, in the present embodiment, the statistical model is caused to learn based on the boke values output from the statistical model for the pixels corresponding to the feature points since the relationship in length between the distances calculated for the feature points extracted in SfM is used. For this reason, in some cases, the statistical model cannot be caused to efficiently learn the bokeh which occurs in, regions where feature points are not included. In this case, the multi-view images used for learning the statistical model may be accumulated, and the user may be notified of areas including a few feature points (for example, areas where the number of feature points is smaller than a predetermined value), based on the distribution of the feature points extracted from the multi-view images. According the configuration, the user can capture the multi-view images in which the (feature points) are included in the notified areas, and the statistical model can be thereby caused to efficiently learn. In addition, images that include the feature points in the notified areas as described above may be automatically selected and learning may be executed using the selected images.

Incidentally, it has been described that the statistical model is caused to learn using the multi-viewpoint images (i.e., a set of multi-viewpoint images, captured in a single scene (domain) in the present embodiment, but the image processing device 3 (learning processing module 35) may be configured to learn the statistical model using multi-viewpoint images captured in a plurality of scenes (i.e., a plurality of sets of multi-viewpoint images).

The scene in the present embodiment refers to a unit of multi-view images captured by the capture device 2 to acquire the distance to a specific subject (i.e., a distance of an unknown scale). In other words, "capturing the multiple viewpoint images in a plurality of scenes" in the present embodiment implies a case where, for example, the multi-view images are captured for each of a plurality of subjects.

FIG. 17 shows first multi-view images 601 obtained by capturing a first subject in a first scene, and second multi-view images 602 obtained by capturing a second subject in a second scene.

In this case, for example, when images $x_i$ and $x_j$ (first and second images) are selected from the first multi-view images 601, the relationship in length between the distance to the first subject (for example, feature point P2) included in the image $x_i$ and the distance to the first subject (for example, feature point P4) included in the image $x_j$ can be discriminated. Similarly, when images $x_i$ and $x_j$ (sixth and seventh images) are selected from the second multi-view images 602, the relationship in length between the distance to the second subject (for example, feature point P2') included in the image $x_i$ and the distance to the second subject (for example, feature point P4') included in the image $x_j$ can be discriminated.

However, the distances calculated from the multi-view images are distances of an unknown scale (i.e., are not distances based on real scales) and, for example, when the image $x_i$ is selected from the first viewpoint image 601 and the image $x_j$ is selected from. The second viewpoint image 602, the distance to the first subject (for example, feature point P2) included in the image $x_i$ cannot be compared with the distance to the second subject (for example, feature point P4') included in the image $x_j$, and the relationship in length between the distances (i.e., the relationship in length between the distances to the images $x_i$ and $x_j$-cannot be discriminated.

In other words, in the present embodiment, the statistical model can be caused to learn using a plurality of sets of multi-view images (first and second multi-view images) as described above, and the images $x_i$ and $x_j$ whose relationship is discriminated need to be selected from the multi-view images captured in the same scene. In other words, it is assumed that the statistical model in the present embodiment does not learn based on the bokeh value (first or second bokeh value) output from the statistical model by inputting one of the first multi-view images and the bokeh value (sixth or seventh bokeh value) output from the statistical model by inputting one of the second multi-view images (in other words the statistical model does not learn between the first and second multi-view images).

In a case where the statistical model is caused to learn using a plurality of sets of multi-view images captured in a plurality of scenes, the plurality of sets of multi-view images are acquired in step S1 shown 21 in FIG. 13, and the process in step S2 is executed for each set of the multi-view images. In addition, it is assumed that in step S3 or this case, for example, a scene is randomly selected in step S3 and the images $x_i$ and $x_j$ are selected from the multi-view images captured in the selected scene.

It has been described that the images $x_i$ and $x_j$ are selected from the multi-view images captured in the same scene. For example, if (at least parts of) first multi-view images captured in a first scene and (at least parts of) second multi-view images captured in a second scene include a common known subject (third subject), the distance calculated from the first multi-view images can be compared with the distance calculated from the second multi-view images and, therefore, the image $x_i$ can be selected from the first multi-view Images and the image $x_j$ can be selected from the second multi-view images (i.e., the statistical model can be caused to learn based on the bokeh value of the image $x_i$ selected from the first multi-view images and the bokeh value of the image $x_j$ selected from the second multi-view images).

Furthermore, in the present embodiment, it has been described that any two images are selected from the multi-view images (a set of learning images) (i.e., the images are selected at random) when the statistical model learns but, for example, images in which a difference of the differences to the subjects (distances of an unknown scale) is more than or equal to a predetermined value may be may be preferentially selected as the two images. According to this, erroneous discrimination of the relationship in length between the distances to the images can be avoided. In addition, the two images (image patches) described above may be selected based on, for example, predetermined regularities corresponding to their positions and pixel values in the multi-view images, and the like.

In the present embodiment, a patch method has been described as an example of the method of predicting the bokeh value from the image in the statistical model, but an image based method of inputting the entire area of the image to the statistical model and outputting a predicted value (bokeh value) corresponding to the entire area may be employed as the method of predicting the distance from the image.

In the present embodiment, it has been described that the statistical model is generated by learning the multi-view images affected by aberration of the optical system (i.e., bokeh that varies nonlinearly in accordance with the distance to the subject included in the image) but, for example, the statistical model may be generated by learning multi-view images generated based on light transmitted through a filter (color filter or the like) provided in the aperture of the capture device 2 (i.e., bokeh that is intentionally generated in the image by the filter and that varies nonlinearly in accordance with the distance to the subject).

In the present embodiment, it has been described that the statistical model inputting the image including the subject outputs the bokeh value indicating the bokeh generated in the image in accordance with the distance to the subject, but the statistical model may be generated to input the image and to output the distance to the subject included in the image. Learning the statistical model is executed based on the distance output from the statistical model instead of the above-described bokeh value.

SECOND EMBODIMENT

Next, a second embodiment will be described. Since a configuration of a ranging system (capture device and image processing device) according to the present embodiment is the same as that of the above-described first embodiment, the configuration of the ranging system of the present embodiment will be described as appropriate with reference to FIG. 1 and the like. Elements different from those of the above-described first embodiment will be mainly described below.

It has been described in the first embodiment that the statistical model outputs the bokeh value indicating the bokeh which occurs in the image in accordance with the distance to the subject included in the image, but it is assumed that the statistical model according to the present embodiment outputs a degree of uncertainty (hereinafter referred to as an uncertainty degree) in the boke value (predicted value) is output together with the bokeh value. The present embodiment is different from the above-described first embodiment in that the statistical model is caused to learn using a rank loss (rank loss function) on which the uncertainty degree thus output from the statistical model is reflected. The uncertainty degree is expressed by, for example, a real number greater than or equal to 0, and it is assumed that the uncertainty degree is higher as the value is larger. A method of calculating the uncertainty degree is not limited to a specific method, but various known methods can be employed as the calculating method.

Figure 18:
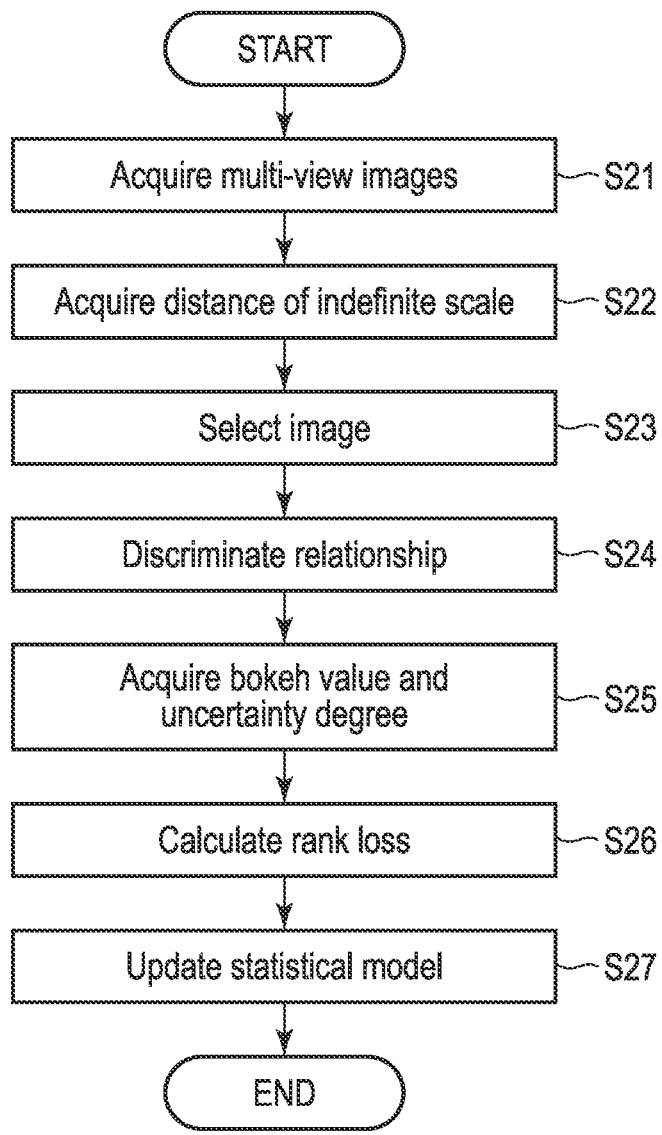
FIG. 18 is a flowchart showing an example of a procedure of an image processing device upon causing a statistical model to learn in a second embodiment.

An example of a procedure of the image processing device 3 upon learning the statistical model in the present embodiment will be described below with reference to a flowchart of FIG. 18.

First, processes of steps S21 to S24 corresponding to the above-described processes of steps S1 to S4 shown in FIG. 13 are executed.

When the process of step S24 is executed, a calculation module 35c acquires a bokeh value indicating bokeh which occurs in an image $x_i$ in accordance with a distance to a subject included in the image $x_i$ and a uncertainty degree corresponding to the bokeh value, and a bokeh value indicating bokeh which occurs in an image $x_j$ in accordance with a distance to a subject included in the image $x_j$ and a uncertainty degree corresponding to the bokeh value, by using a statistical model stored in a statistical model storage 31 (step S25).

When the above-described uncertainty degree is represented by $\sigma$, in step S25, a bokeh value $f_\theta(x_i)$ and an uncertainty degree $\sigma_i$ output from a statistical model $f_\theta$ by inputting the image $x_i$, and a bokeh value $f_\theta(x_j)$ and an uncertainty degree $\sigma_j$ output from the statistical model $f_\theta$ by inputting the image $x_j$, are acquired in step S25.

Next, the calculation module 35c calculates the rank loss based on the bokeh value and the uncertainty degree acquired in step S25 (step S26).

In the above-described first embodiment, it has been described that the rank loss is calculated using the expression (4), but the function (rank loss function) indicating the rank loss in the present embodiment is defined below in expression (9).

$$L_{uncrt}(x_i, x_j) = \frac{1}{\sigma} L_{rank}(x_i, x_j) + \log\sigma \qquad \text{Expression (9)}$$

$$\sigma = \max(\sigma_i, \sigma_j) \qquad \text{Expression (10)}$$

In the expression (9), $L_{uncrt}(x_i,x_j)$ represents the rank loss calculated in the present embodiment, and $L_{rank}(x_i, x_j)$ is the same as $L_{rank}(x_i, x_j)$ of expression (4) in the above-described first embodiment.

For example, when an area having no texture or an area (image patch) where light is saturated (i.e., which is blown out) region is selected as the image $x_i$ or $x_j$, it is difficult to output high-accuracy bokeh values using the statistical model (i.e., to predict correct bokeh values and to acquire high-accuracy distances). In the above-described first embodiment, however, the statistical model attempts to learn to satisfy the relationship in length between the distances to the images $x_i$ and $x_j$ even in the area where there are no or few clues to predict the bokeh value (hereinafter referred to as a "hard-to-predict area"), and thus overlearning may occur. In this case, the statistical model is optimized for the hard-to-predict area, and the versatility of the statistical model is reduced.

Therefore, in the present embodiment, the rank loss is calculated in consideration of the unpredictability in the above-described hard-to-predict area by adding the uncertainty degree $\sigma$ to the loss unction as shown in above-described expression (9). In expression (9), $\sigma$ rep resents the uncertainty degree having a larger value among the uncertainty degree at $\sigma_i$ and the uncertainty degree $\sigma_j$ as defined in expression (10).

According to the rank loss function (uncertainty rank loss function) as shown in expression (9), if $L_{rank}(x_i, x_j)$ cannot be reduced (made smaller) in the hard-to-predict area, $L_{uncrt}$ ($x_i$, $x_j$), which is the rank loss in the present embodiment can be adjusted to lower by increasing at least one of the uncertainty degrees $\sigma_i$ and $\sigma_j$ (i.e., the uncertainty degree $\sigma$). To prevent $L_{uncrt}$($x_i$, $x_j$) from being lowered too much by increasing the uncertainty degree $\sigma$ excessively, a second term is added to the right side of expression (9) as a penalty.

The rank loss function shown in expression (9) can be obtained by, for example, extending a definitional expression of heteroscedasticity.

When the process in step S26 is executed, a process in step S27 corresponding to the above-described process in step S7 shown in FIG. 13 is executed. In step S27, the statistical model may be caused to learn $L_{rank}$($x_i$, $x_j$) of the expression (7) described in the first embodiment as $L_{uncrt}$ ($x_i$, $x_j$).

As described above, in the present embodiment, when the statistical model is caused to learn to minimize the rank loss calculated based on the bokeh values (first and second bokeh values) of the images $x_i$ and $x_j$ the rank loss is adjusted based on at least one of the uncertainty degrees (first and second uncertainty degrees) output from the statistical model to which the images $x_i$ and $x_j$ are input.

In the present embodiment, since an influence which the above hard-to-predict area gives to learning of the statistical model can be mitigated by the configuration, learning the high-accuracy statistical model can be implemented.

THIRD EMBODIMENT

Next, a third embodiment will be described. Since a configuration of a ranging system (capture device and image processing device) according to the present embodiment is the same as that of the above-described first embodiment, the configuration of the ranging system of the present embodiment will be described as appropriate with reference to FIG. 1 and the like. Elements different from those of the above-described first embodiment will be mainly described below.

The present embodiment is different from the first embodiment in that the statistical model is caused to learn such that the relationship in length between the distances to two images (learning images) including the subjects located at different distances as described in the first embodiment above is satisfied and that the variation in the bokeh values of two images (learning images) including the subjects located at substantiality the same distance is minimum.

An example of the procedure of the image processing device 3 upon causing the statistical model to learn in the present embodiment will be described below. The example will be described with reference to the flowchart of FIG. 13 for convenience.

First, the processes of steps S1 and S2 described in the first embodiment are executed.

It has been described in the above-described first embodiment that two images, i.e., images $x_i$ and $x_j$, are selected. In the present embodiment, the learning processing module 35 selects three images from the multi-view images acquired in step S1 (step S3).

When the three images selected in step S3 are images $x_i$, $x_j$, and $x_k$, the images $x_i$, $x_j$, and $x_k$ have the relationship that, for example, the distance to the subject included in the image $x_i$ is different from the distance to the subject included in the image $x_j$ and that the distance to the subject included in the image $x_i$ is substantially the same as the distance to the subject included in the image $x_k$. In other words, in step S3, the learning processing module 35, selects the images $x_i$, $x_j$, and $x_k$ having the above relationship, based on, for example, the distance of an unknown scale acquired in step S2.

In the present embodiment, "the distance to the subject included in the image $x_i$ is substantially the same as the distance to the subject included in the image $x_k$" indicates that, for example, a difference between the two distances is smaller than or equal to a predetermined value.

In addition, the images $x_i$, $x_j$, and $x_k$ in the present embodiment are the image patches cut out from at least one of the multi-view images similarly to the images $x_i$ and $x_j$ described above in the first embodiment, but may be a whole body of the images.

When the process of step S3 is executed, the processes in steps S4 and S5 described above in the first embodiment are executed.

In step S5, the bokeh value $f_\theta(x_i)$ output from the statistical model $f_\theta$ is acquired by inputting the image $x_i$, the bokeh value $f_\theta(x_j)$ output from the statistical model $f_\theta$ is acquired by inputting the image $x_j$, and the bokeh value $f_\theta(x_k)$ output from the statistical model $f_\theta$ is acquired by inputting the image $x_k$.

Next, the calculation module 35c calculates the rank loss based on the token values acquired in step 35 (i.e., the bokeh value $f_\theta(x_i)$ of the image $x_i$, the bokeh value $f_\theta(x_j)$ of the image $x_j$, and the bokeh value $f_\theta(x_k)$ of the image $x_k$) (step S6).

In the images $x_i$, $x_j$, and $x_k$, the distance to the subject included in the image $x_1$ is different from the distance to the subject included in the image $x_j$, and the distance to the subject included in the image $x_i$ is substantiality the same as the distance to the subject included in the image $x_k$, as described above. In the present embodiment, focusing on this point, it is assumed that the statistical model is caused to learn to satisfy the relationship in length between the distances to the images $x_i$ and $x_j$ and to minimize the variation of the bokeh values of the images $x_i$ and $x_k$.

In this case, the function (rank loss function) representing the rank loss in the present embodiment is defined below in expression (11).

$$L_{intra}(x_i,x_j,x_k)=L_{rank}(x_i,x_j)+\lambda|f_\theta(x_i)-f_\theta(x_k)| \qquad \text{Expression (11)}$$

$$\text{rank}(x_i)\neq\text{rank}(x_j), \text{rank}(x_i)=\text{rank}(x_k) \qquad \text{Expression (12)}$$

In the expression (11), $L_{intra}$ ($x_i$, $x_j$, $x_k$) represents the rank loss calculated in the present embodiment, and $L_{rank}$($x_i$, $x_j$) corresponds to $L_{rank}$($x_i$, $x_j$) in the expression (4) in the above-described first embodiment.

In addition, a second term in the right side of the expression (11) represents the variation (difference) between the bokeh value of the image $x_i$ and the bokeh value of the image $x_k$, and $\lambda$ in the second term refers to an arbitrary coefficient ($\lambda>0$) for balancing with the first term in the right side.

Expression (12) represents the relationship that the images $x_i$, $x_j$, and $x_k$ in the present embodiment have (i.e., the relationship in length among the distances to the subjects included in the respective images $x_i$, $x_j$, and $x_k$).

When the process of step S6 is executed, the process of step S7 described in the first embodiment is executed. In step S7, the statistical model may be caused to learn $L_{rank}$($x_i$, $x_j$) of expression (7) described above in the first embodiment as $L_{intra}$.

In the present embodiment, as described above, since the statistical model is caused to learn such that the difference between the bokeh values (first and third bokeh values) output from the statistical model by inputting two images $x_i$ and $x_k$ (first and third images) including the subjects located in substantially the same distances (distances at which the difference is smaller than or equal to a predetermined value), learning of the statistical model with a higher accuracy in consideration of the variation in the bokeh values of the images $x_i$ and $x_k$ as compared with the above-described first embodiment can be implemented.

In the present embodiment, it has been described that the rank loss is calculated by considering the variation in the distances to the subjects included in the images $x_i$ and $x_k$ but, for example, an image $x_l$ including a subject located at substantially the same distance as the subject included in the image $x_j$ may be further selected and the rank loss function for calculating the rank loss further considering the variation in bokeh values of the image $x_j$ and $x_l$ may be used similarly to the following expression (13).

$$L_{intra}(x_i,x_j,x_k,x_l)=L_{rank}(x_i,x_j)+\lambda|f_\theta(x_i)-f_\theta(x_k)|+\lambda|f_\theta(x_j)-f_\theta(x_l)| \quad \text{Expression (13)}$$

When the rank loss function expression (13) is used, four images (images $x_i$, $x_j$, $x_k$, and $x_l$) are selected in step S3 described above. In addition, it is assumed that the images $x_i$, $x_j$, $x_k$, and $x_l$ have the relationship that the distance to the subject included in the image $x_i$ is different from the distance to the subject included in the image $x_j$, that the distance to the subject included in the image $x_i$ is substantially the same as the distance to the subject included in the $x_k$, and that the distance to the subject included in the image $x_j$ is substantially the same as the distance to the subject included in the image $x_l$.

A third term in the right side of expression (13) represents the variation (difference) between the bokeh values of the images $x_j$ and $x_l$, and $\lambda$ in the third term refers to an arbitrary coefficient ($\lambda>0$) for balancing with the first term in the right side.

The present embodiment may be configured in combination with the above-described second embodiment. In this case, a rank loss function such as the following expression (14) can be used.

$$L_{intra}(x_i, x_j, x_k) = \frac{1}{\sigma}L_{rank}(x_i, x_j) + \log\sigma + \lambda|f_\theta(x_i) - f_\theta(x_k)| \quad \text{Expression (14)}$$

According to at least one of the above-described embodiments, a learning method, a program, and an image processing device capable of improving the ease of learning in the statistical model for acquiring the distance to the subject, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning method causing a statistical model to learn, the statistical model being a statistical model for inputting an image including a subject and outputting a bokeh value indicating bokeh occurring in the image in accordance with a distance to the subject, and the learning method comprising:

acquiring first multi-view images obtained by capturing a first subject from multiple viewpoints by a capture device; and causing the statistical model to learn, based on a first bokeh value output from the statistical model by inputting a first image of the first multi-view images, and a second bokeh value output from the statistical model by inputting a second image of the first multi-view images, wherein the causing the statistical model to learn includes:
acquiring (i) a first distance from the capture device to a first subject included in the first image upon capturing the first image, and (ii) a second distance from the capture device to a first subject included in the second image upon capturing the second image, from the first multi-view images;

discriminating a relationship in length between the first distance and the second distance; and causing the statistical model to learn such that a relationship in magnitude between the first bokeh value and the second bokeh value is equal to the discriminated relationship.

2. The learning method according to claim 1, wherein:
the statistical model outputs the first bokeh value and a first uncertainty degree of the first bokeh value by inputting the first image, and outputs the second bokeh value and a second uncertainty degree of the second bokeh value by inputting the second image, the causing the statistical model to learn includes causing the statistical model to learn such that a rank loss calculated based on the first bokeh value and the second bokeh value output from the statistical model is minimized, and the rank loss is adjusted based on at least one of the first uncertainty degree and the second uncertainty degree.

3. The learning method according to claim 1, wherein:
the statistical model inputs a third image of the first multi-view images and outputs a third bokeh value, the causing the statistical model to learn includes causing the statistical model to learn such that a difference between the first bokeh value and the third bokeh value is minimized, and a difference between the first distance from the capture device to the first subject included in the first image upon capturing the first image and a third distance from the capture device to the first subject included in the third image upon capturing the third image is smaller than or equal to a predetermined value.

4. The learning method according to claim 1, wherein the first multi-view images are captured in a state in which a focus of the capture device is fixed.

5. The learning method according to claim 1, wherein the causing the statistical model to learn includes causing the statistical model to learn, based on a fourth bokeh value output from the statistical model by inputting a fourth image captured from a viewpoint different from the first image of the first multi-view images, and a fifth bokeh value output from the statistical model by inputting a fifth image captured from a viewpoint different from the second image of the first multi-view images, after causing the statistical model to learn based on the first and second bokeh values.

6. The learning method according to claim 1, further comprising:

acquiring second multi-view images obtained by capturing a second subject from multiple viewpoints by the capture device, wherein the causing the statistical model to learn further includes causing the statistical model to learn, based on a sixth bokeh value output from the statistical model by inputting a sixth image of the second multi-view images, and a seventh bokeh value output from the statistical model by inputting a seventh image included in the second multi-view images.

7. The learning method according to claim 6, wherein the statistical model does not learn based on a combination of (i) one of the first and second bokeh values and (ii) one of the sixth and seventh bokeh values.

8. The learning method according to claim 6, wherein the causing the statistical model to learn includes causing the statistical model to learn based on the first bokeh value and the sixth bokeh value when a third subject different from the first and second subjects is included in at least parts of the first multi-view images and at least parts of the second multi-view images.

9. The learning method according to claim 1, further comprising:
performing notification to provide guidance such that a plurality of positions from a front side to a back side are focused when the first multi-view images are captured by the capture device.

10. The learning method according to claim 1, further comprising:
performing notification to provide guidance such that an image including the first subject is captured when the first multi-view images are captured by the capture device.

11. An image processing device causing a statistical model to learn, the statistical model being a statistical model for inputting an image including a subject and outputting a bokeh value indicating bokeh occurring in the image in accordance with a distance to the subject, and the image processing device comprising:
a processor configured to execute processes comprising:
acquiring multi-view images obtained by capturing a subject from multiple viewpoints by a capture device; and
causing the statistical model to learn, based on a first bokeh value output from the statistical model by inputting a first image of the multi-view images, and a second bokeh value output from the statistical model by inputting a second image of the first multi-view images,
wherein the causing the statistical model to learn comprises:
acquiring (i) a first distance from the capture device to a subject included in the first image upon capturing the first image, and (ii) a second distance from the capture device to a subject included in the second image upon capturing the second image, from the first multi-view images;
discriminating a relationship in length between the first distance and the second distance; and
causing the statistical model to learn such that a relationship in magnitude between the first bokeh value and the second bokeh value is equal to the discriminated relationship.

12. The device according to claim 11, wherein:
the statistical model inputs a third image of the first multi-view images and outputs a third bokeh value,
the processor is configured to cause the statistical model to learn such that a difference between the first bokeh value and the third bokeh value is minimized, and
a difference between the first distance from the capture device to the first subject included in the first image upon capturing the first image and a third distance from the capture device to the first subject included in the third image upon capturing the third image is smaller than or equal to a predetermined value.

13. A non-transitory computer-readable storage medium having stored thereon a program which is executable by a computer of an image processing device and causes a statistical model to learn, the statistical model being a statistical model for inputting an image including a subject and outputting a bokeh occurring in the image in accordance with a distance to the subject, and the program comprising instructions executable by the computer to control the computer to execute functions comprising:
acquiring multi-view images obtained by capturing a subject from multiple viewpoints by a capture device; and
causing the statistical model to learn, based on a first bokeh value output from the statistical model by inputting a first image of the multi-view images, and a second bokeh value output from the statistical model by inputting a second image of the first multi-view images,
wherein the causing the statistical model to learn includes:
acquiring (i) a first distance from the capture device to a subject included in the first image upon capturing the first image, and (ii) a second distance from the capture device to a subject included in the second image upon capturing the second image, from the first multi-view images;
discriminating a relationship in length between the first distance and the second distance; and
causing the statistical model to learn such that a relationship in magnitude between the first bokeh value and the second bokeh value is equal to the discriminated relationship.

14. The storage medium according to claim 13, wherein:
the statistical model outputs the first bokeh value and a first uncertainty degree of the first bokeh value by inputting the first image, and outputs the second bokeh value and a second uncertainty degree of the second bokeh value by inputting the second image,
the causing the statistical model to learn includes causing the statistical model to learn such that a rank loss calculated based on the first bokeh value and the second bokeh value output from the statistical model is minimized, and
the rank loss is adjusted based on at least one of the first uncertainty degree and the second uncertainty degree.

15. The storage medium according to claim 13, wherein:
the statistical model inputs a third image of the first multi-view images and outputs a third bokeh value,
the causing the statistical model to learn includes causing the statistical model to learn such that a difference between the first bokeh value and the third bokeh value is minimized, and
a difference between the first distance from the capture device to the first subject included in the first image upon capturing the first image and a third distance from the capture device to the first subject included in the third image upon capturing the third image is smaller than or equal to a predetermined value.

16. The storage medium according to claim 13, wherein the causing the statistical model to learn includes causing the statistical model to learn, based on a fourth bokeh value output from the statistical model by inputting a fourth image captured from a viewpoint different from the first image of the first multi-view images, and a fifth bokeh value output from the statistical model by inputting a fifth image captured from a viewpoint different from the second image of the first multi-view images, after causing the statistical model to learn based on the first and second bokeh values.

17. The storage medium according to claim 13, further comprising:
acquiring second multi-view images obtained by capturing a second subject from multiple viewpoints by the capture device,
wherein the causing the statistical model to learn further includes causing the statistical model to learn, based on a sixth bokeh value output from the statistical model by inputting a sixth image of the second multi-view images, and a seventh bokeh value output from the statistical model by inputting a seventh image included in the second multi-view images.

18. The device according to claim 11, wherein:
the statistical model outputs the first bokeh value and a first uncertainty degree of the first bokeh value by inputting the first image, and outputs the second bokeh value and a second uncertainty degree of the second bokeh value by inputting the second image,
the processor is configured to cause the statistical model to learn such that a rank loss calculated based on the first bokeh value and the second bokeh value output from the statistical model is minimized, and
the rank loss is adjusted based on at least one of the first uncertainty degree and the second uncertainty degree.

19. The device according to claim 11, wherein the processor is configured to cause the statistical model to learn, based on a fourth bokeh value output from the statistical model by inputting a fourth image captured from a viewpoint different from the first image of the first multi-view images, and a fifth bokeh value output from the statistical model by inputting a fifth image captured from a viewpoint different from the second image of the first multi-view images, after causing the statistical model to learn based on the first and second bokeh values.

20. The device according to claim 11, wherein the processor is further configured to:
acquire second multi-view images obtained by capturing a second subject from multiple viewpoints by the capture device, and
cause the statistical model to learn, based on a sixth bokeh value output from the statistical model by inputting a sixth image of the second multi-view images, and a seventh bokeh value output from the statistical model by inputting a seventh image included in the second multi-view images.

* * * * *